United States Patent
Jovicic et al.

(10) Patent No.: US 9,037,001 B2
(45) Date of Patent: May 19, 2015

(54) METHOD AND APPARATUS OF DECODING LOW-RATE VISIBLE LIGHT COMMUNICATION SIGNALS

(71) Applicant: QUALCOMM Incorporated, San Diego, CA (US)

(72) Inventors: Aleksandar Jovicic, Jersey City, NJ (US); Thomas Joseph Richardson, South Orange, NJ (US); Ivan Klimek, Ganovce (SK)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 13/802,733

(22) Filed: Mar. 14, 2013

(65) Prior Publication Data
US 2014/0270796 A1 Sep. 18, 2014

(51) Int. Cl.
- H04B 10/00 (2013.01)
- H04B 10/116 (2013.01)
- G03B 7/00 (2014.01)
- H04B 10/114 (2013.01)

(52) U.S. Cl.
CPC ............... *H04B 10/116* (2013.01); *G03B 7/00* (2013.01); *H04B 10/1141* (2013.01)

(58) Field of Classification Search
CPC ........................................ H04B 10/11–10/116
USPC ........................................ 398/118–131, 172
See application file for complete search history.

(56) References Cited

U.S. PATENT DOCUMENTS

| | | | | |
|---|---|---|---|---|
| 6,400,889 | B1 * | 6/2002 | Boon | 386/353 |
| 7,663,501 | B2 * | 2/2010 | Hyun et al. | 340/815.65 |
| 8,248,467 | B1 | 8/2012 | Ganick et al. | |
| 2003/0007781 | A1 * | 1/2003 | Boon | 386/68 |
| 2003/0026590 | A1 * | 2/2003 | Todo et al. | 386/47 |
| 2003/0059099 | A1 | 3/2003 | Tateishi | |
| 2006/0280246 | A1 * | 12/2006 | Alattar et al. | 375/240.15 |
| 2008/0278591 | A1 * | 11/2008 | Barna et al. | 348/216.1 |
| 2009/0041476 | A1 | 2/2009 | Ann et al. | |
| 2009/0052902 | A1 | 2/2009 | Shinokura | |
| 2011/0135317 | A1 | 6/2011 | Chaplin | |
| 2013/0027576 | A1 * | 1/2013 | Ryan et al. | 348/222.1 |
| 2013/0272717 | A1 * | 10/2013 | Deguchi et al. | 398/154 |

(Continued)

OTHER PUBLICATIONS

Hao, et al., "COBRA: Color Barcode Streaming for Smartphone Systems", Department of Computer Science and Engineering, Michigan State University, 2012, 14pgs.

(Continued)

*Primary Examiner* — Li Liu
(74) *Attorney, Agent, or Firm* — Holland & Hart LLP

(57) ABSTRACT

Methods and apparatus related to the detection of low-rate visible light communication (VLC) signals and the recovery of information communicated by the VLC signals are described. Various methods and apparatus are well suited for embodiments in which a device, e.g., a smartphone, including a camera which uses a rolling shutter. The rolling shutter facilitates the collection of different time snapshots of a received low rate time varying VLC signal with different pixel rows in the image sensor of a frame corresponding to different time snapshots. In some embodiments, demodulation is used to recover and identify a single tone being communicated in a frame from among a plurality of possible alternative tones that may be communicated, each different tone corresponding to a different set of information bits.

20 Claims, 16 Drawing Sheets

(56) References Cited

U.S. PATENT DOCUMENTS

2014/0226977 A1* 8/2014 Jovicic et al. ............. 398/26
2014/0270799 A1* 9/2014 Roberts et al. ............. 398/130

OTHER PUBLICATIONS

Pang, et al., "LED Location Beacon System Based on Processing of Digital Images", Ieee Transactions on Intelligent Transportation Systems, 2001, v. 2 n. 3, p. 135-150.

Danakis et al, "Using a CMOS Camera Sensor for Visible Light Communication," GC'12 Workshop—OWC: 3rd IEEE Workshop on Optical Wireless Communications (OWC'12),Dec. 3, 2012, Anaheim, California, US, 6 pgs.
ISA/EPO, International Search Report and Written Opinion of the International Searching Authority, Int'l App. No. PCT/US2014/021054, Jun. 20, 2014, European Patent Office, Rijswijk, NL, 11 pgs.
IPEA/EPO, Second Written Opinion of the International Preliminary Searching Authority, Int'l. App. No. PCT/US2014/021054, Mar. 13, 2015, European Patent Office, Munich, DE, 6 pgs.

* cited by examiner

| FIGURE 4A | FIGURE 4B | FIGURE 4C |

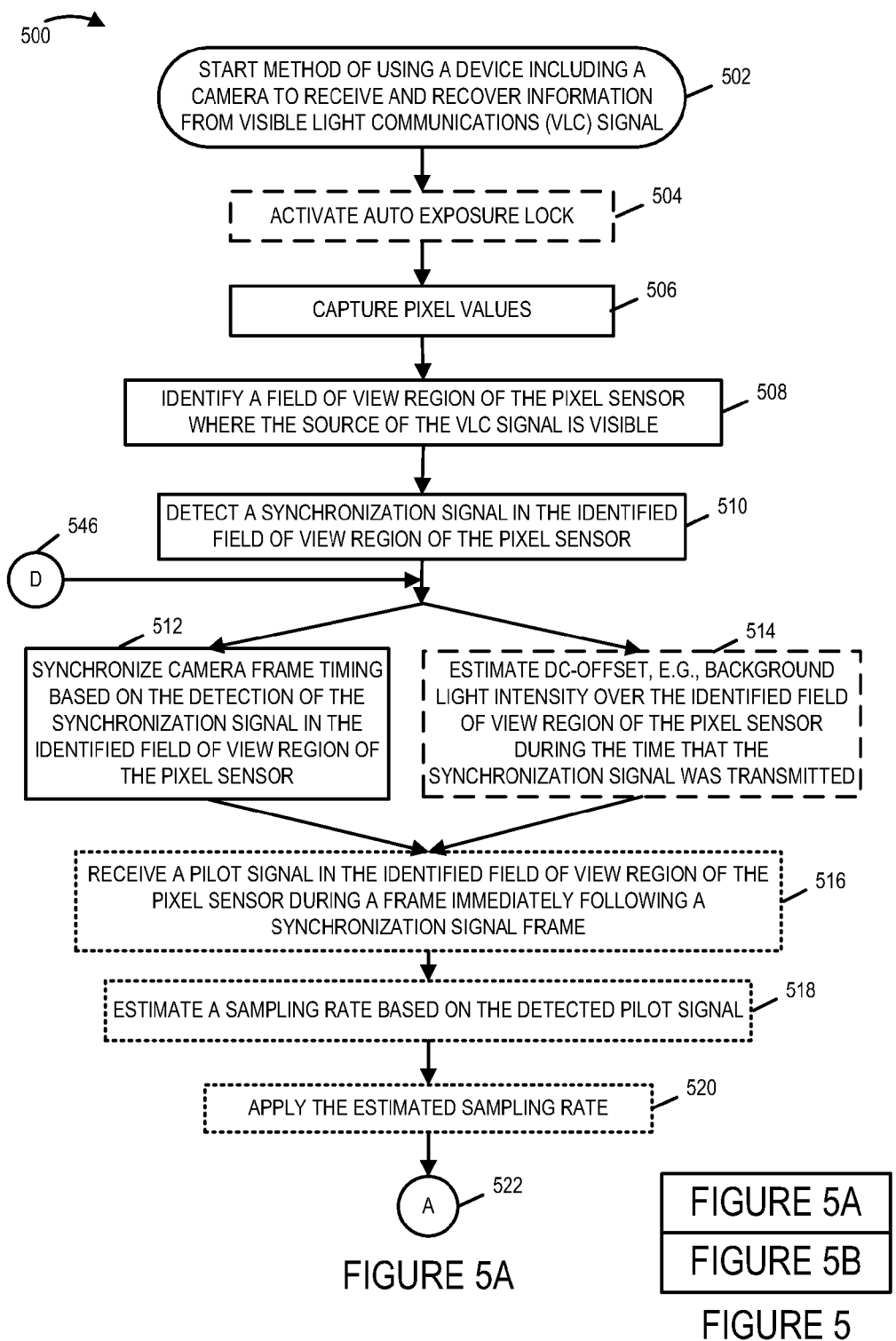

| FIGURE 6A | FIGURE 6B |

METHOD AND APPARATUS OF DECODING LOW-RATE VISIBLE LIGHT COMMUNICATION SIGNALS

FIELD

Various embodiments are directed to visible light communications, and more particularly, to recovering and decoding low-rate VLC signals using a device including a camera.

BACKGROUND

Light Emitting Diodes (LEDs) capable of generating white light are projected to become the dominant source of lighting in the commercial and residential sectors in the future. LED lighting provides an opportunity to communicate visible light communications (VLC) signaling for a wide range of applications.

In many applications there is, or is expected to be, a need to decode low-rate visible light communication messages. The envisioned use cases include, e.g., indoor positioning, security for building/network access, augmented displays, mobile device pairing, etc. Specialized dedicated VLC receiver devices can be built to detect and decode VLC signals. Unfortunately, using specialized dedicated VLC receiver devices can be costly, and the specialized VLC receiver devices may not be widely distributed in the general population. It would be advantageous if new method and apparatus were developed such that commonly available devices, or slightly modified commonly available devices, e.g., smartphones, could be utilized to recover low-rate VLC communications messages and/or other information communicated via a VLC signal.

SUMMARY

Various embodiments, are directed to methods and apparatus related to the detection of low-rate visible light communication (VLC) signals and the recovery of information communicated by the VLC signals. In some embodiments, the detection of the VLC signal is performed by a device, e.g., a smartphone, equipped with a camera. In at least some such embodiments, no additional photo-detecting hardware is required at the receiver with the camera serving as the VLC receiver. Various exemplary methods and apparatus are well suited for embodiments in which a device, e.g., a smartphone, includes a camera which uses a rolling shutter. The rolling shutter facilitates the collection of different time snapshots of a received low rate time varying VLC signal with different pixel rows in the image sensor of a frame corresponding to different time snapshots. In some embodiments, demodulation is used to recover and identify a single tone, e.g., frequency, being communicated in a frame from among a plurality of possible alternative tones, e.g., frequencies, that may be communicated, each different tone corresponding to a different set of information bits. In some other embodiments, information bits are demodulated from the position of the light pulse in time. In some such embodiments, Pulse Position Modulation (PPM) is used to convey the information bits.

An exemplary method of using a device including a camera to receive and recover information from a visible light communication (VLC) signal, in accordance with some embodiments, includes summing pixel values in each row of pixel values corresponding to a first region of an image sensor to generate a first array of pixel value sums, at least some of said pixel value sums representing energy recovered from different portions of said VLC light signal, said different portions being output at different times and with different intensities; and performing a first demodulation operation on the first array of pixel value sums to recover information communicated by the VLC signal. An exemplary device including a camera which receives and recovers information from a visible light communication (VLC) signal, in accordance with some embodiments, includes: an image sensor, at least one processor coupled to said image sensor, said processor configured to: sum pixel values in each row of pixel values corresponding to a first region of an image sensor to generate a first array of pixel value sums, at least some of said pixel value sums representing energy recovered from different portions of said VLC light signal, said different portions being output at different times and with different intensities; and perform a first demodulation operation on the first array of pixel value sums to recover information communicated by the VLC signal. The exemplary device including a camera further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 5A is a first part of a flowchart of an exemplary method of using a device including a camera to receive and recover information from a visible light communications (VLC) signal in accordance with various exemplary embodiments.

DETAILED DESCRIPTION

Figure 1:
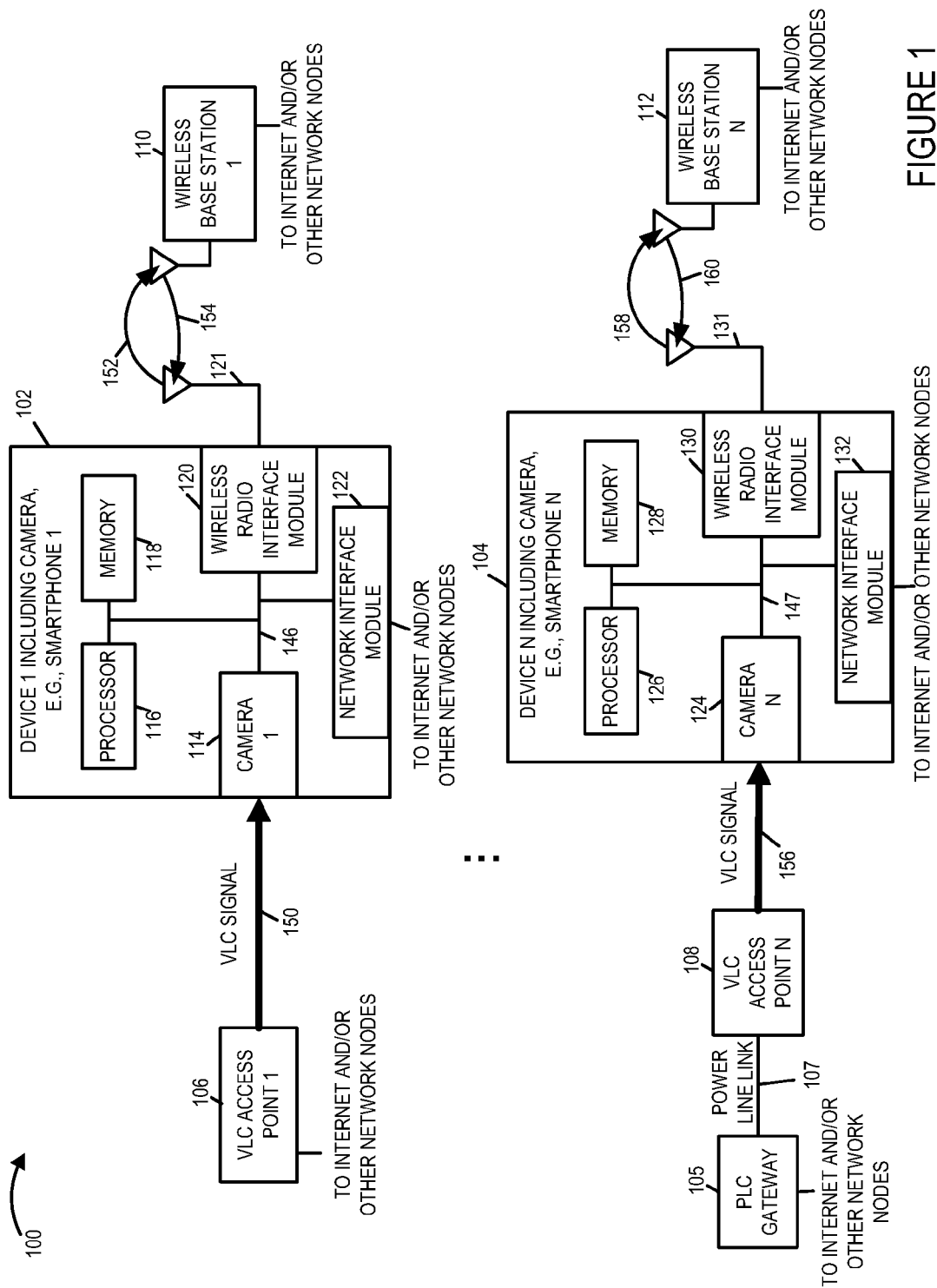
FIG. 1 includes an exemplary communications system supporting VLC communications in accordance with an exemplary embodiment.

FIG. 1 includes an exemplary communications system 100 supporting VLC communications in accordance with an exemplary embodiment. Exemplary communications system 100 includes a plurality of devices including cameras (device 1 102 including camera 1 114, e.g., smartphone 1, . . . , device N 104 including camera N 124, e.g., smartphone N), a plurality of VLC access points (VLC access point 1 106, . . . , VLC access point N 108), and a plurality of wireless base stations (wireless base station 1 110, . . . , wireless base station N 112). In some embodiments, the VLC access points are light emitting diode (LED) access points. In some embodiments, at least some of the VLC access points serve to both illuminate an area of a room and to communicate information using VLC signals. Exemplary communications system 100 further includes a plurality of power line communications (PLC) gateway devices such as PLC gateway 105. PLC gateway device 105 is coupled to VLC access point N 108 via power line link 107.

Device 1 102 and device N 104 are mobile communications devices which may move through the system 100. At different times, a mobile communications device (102, . . . , 104) may be at a different location in the system and may be in range of a different set of VLC access points and wireless base stations.

Device 1 102, e.g., a smartphone, includes a camera 114, a processor 116, memory 118, a wireless radio interface 120, and a network interface module 122 coupled together via a bus 146 over which the various elements (114, 116, 118, 120, 122) may interchange data and information. Device N 104, e.g., a smartphone, includes a camera 124, a processor 126, memory 128, a wireless radio interface 130, and a network interface module 132 coupled together via a bus 147 over which the various elements (124, 126, 128, 130, 132) may interchange data and information.

VLC access point 1 106 generates and transmits VLC signal 150. In one example VLC signal 150 communicates an identifier corresponding to VLC access point 1 106. VLC signal 150 is detected and processed by device 1 102. Recovered data, communicated in VLC signal 150, may be, and sometimes is communicated in output uplink signal 152 transmitted, via antenna 121 to wireless base station 1 110. Device 1 102 also receives downlink signals 154 from wireless base station 1 110.

PLC gateway device 105 receives, via the Internet and/or a backhaul network including other network nodes, information to be communicated to device N 104. PLC gateway device 105 communicates the information via PLC signals over power line 107 to VLC access point N 108. VLC access point N 108 recovers the information to be communicated to device N 104 from the received PLC signals and encodes the information to be communicated to device N 104 into VLC signal 156. VLC access point N 108 transmits generated VLC signal 156 to device N 104. VLC signal 156 is detected and processed by device N 104. Recovered data, communicated in VLC signal 156, may be, and sometimes is communicated in output uplink signal 158 transmitted, via antenna 131 to wireless base station N 112. Device N 104 also receives downlink signals 160 from wireless base station N 112.

Figures 2, 2A:
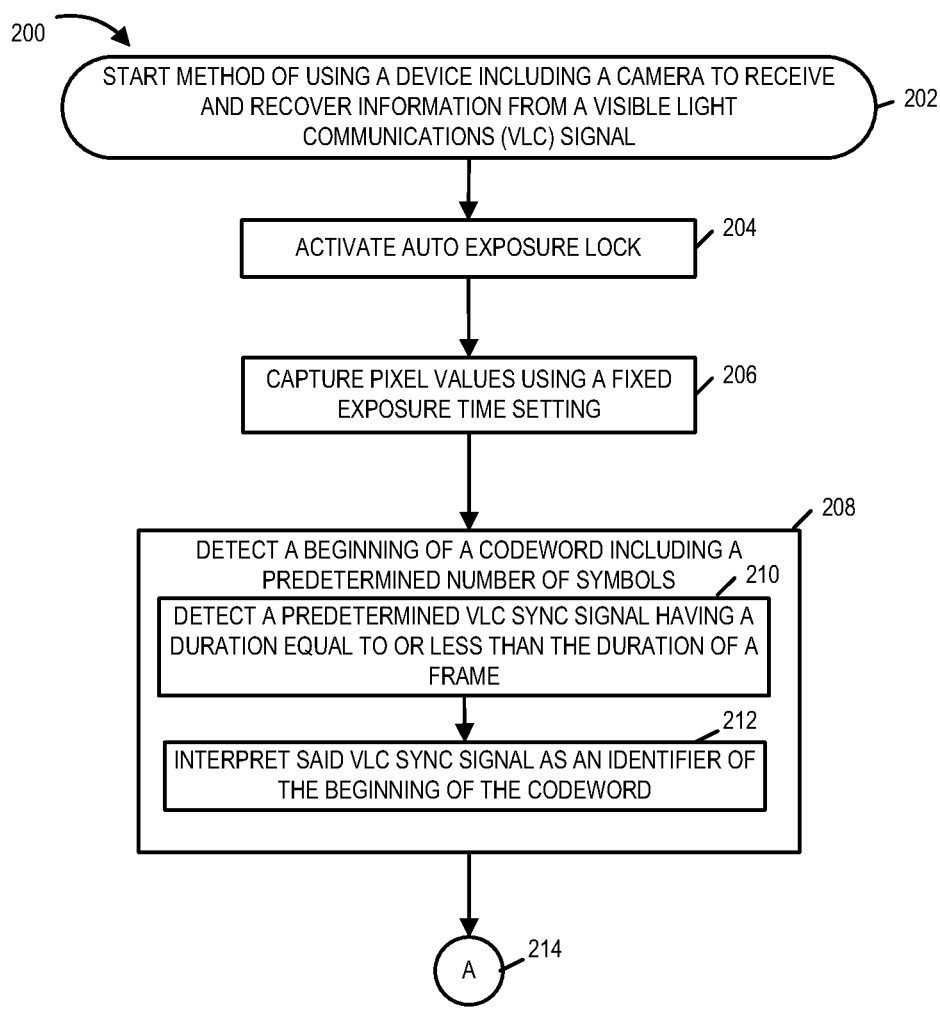
FIG. 2A is a first part of a flowchart of an exemplary method of operating a device including a camera to receive and recover information from a visible light communications (VLC) signal in accordance with an exemplary embodiment.
Figure 2B:
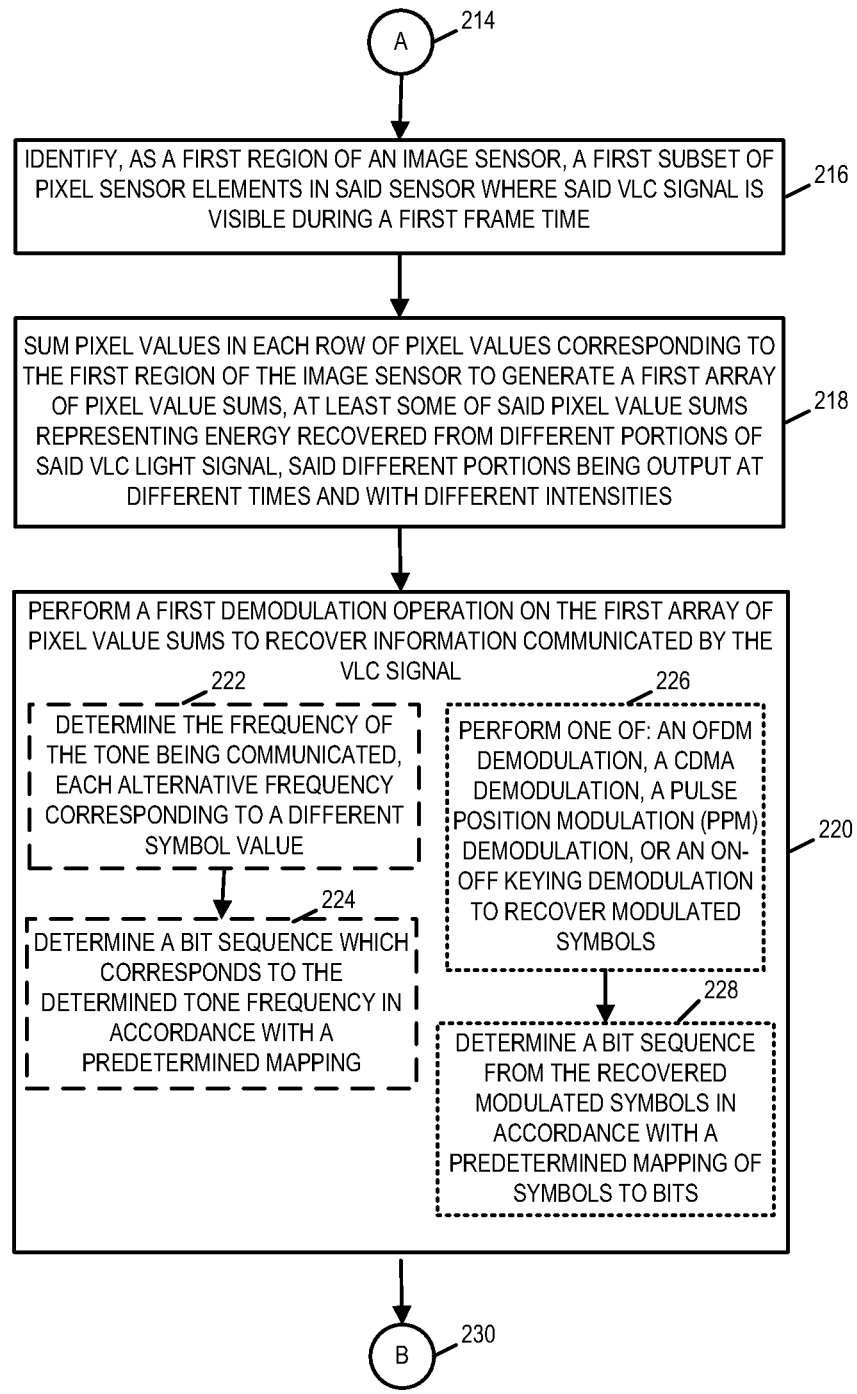
FIG. 2B is a second part of a flowchart of an exemplary method of operating a device including a camera to receive and recover information from a visible light communications (VLC) signal in accordance with an exemplary embodiment.
Figure 2C:
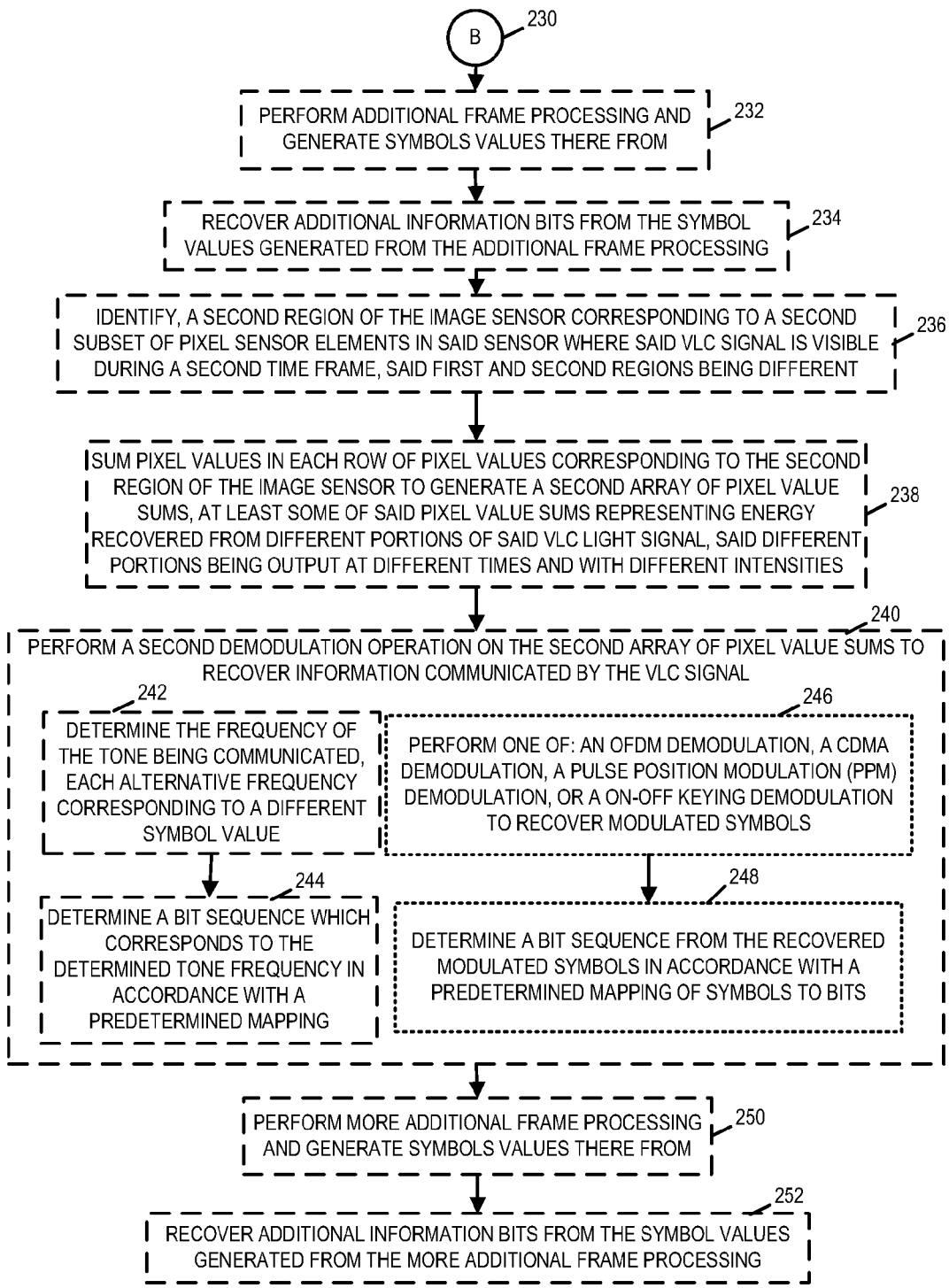
FIG. 2C is a third part of a flowchart of an exemplary method of operating a device including a camera to receive and recover information from a visible light communications (VLC) signal in accordance with an exemplary embodiment.

FIG. 2, comprising the combination of FIG. 2A, FIG. 2B, and FIG. 2C, is a flowchart 200 of an exemplary method of operating a device including a camera to receive and recover information from a visible light communications (VLC) signal in accordance with various exemplary embodiments. The camera is, e.g., a camera with a rolling shutter. In various embodiments, the device including a camera is, e.g., a smartphone. In some embodiments, the camera supports an auto exposure lock which when enabled disables automatic exposure. In an auto exposure mode, exposure time will typically vary as a function of light intensity, which is undesirable for recovering information from VLC signals. Operation of the exemplary method starts in step 202, in which the camera is powered on and initialized.

Operation proceeds from step 202 to step 204, in which the device activates auto exposure lock. Operation proceeds from step 204 to step 206, in which the device captures pixel values using a fixed exposure time setting. In some embodiments, the fixed exposure setting is predetermined by the camera, e.g., 30 frames per second (fps). This is important so that the exposure time is uniform for different rows and frames so that frequency of the sampling does not affect the determined frequency of the recovered symbols, e.g., thereby avoiding frequency shifts due to changes sampling times. Operation proceeds from step 206 to step 208. In step 208 the device detects a beginning of a codeword including a predetermined number of symbols. Step 208 includes steps 210 and 212. In step 210 the device detects a predetermined VLC sync signal having a duration equal to or less than the duration of a frame. In some embodiments, the predetermined sync signal is a nominal low intensity light output. In some other embodiments, the predetermined sync signal is a fully off light output. In various embodiments, the nominal low intensity light output is used for synchronization instead of the fully off signal since it is less annoying to a human observer in the vicinity. In some other embodiments, the sync signal is a sequence of light intensity pulses whose pattern is known to the receiver. Operation proceeds from step 210 to step 212. In step 212 the device interprets said VLC sync signal as an identifier of the beginning of a codeword. Operation proceeds from step 208, via connecting node A 214 to step 216.

In step 216, the device identifies, as a first region of the image sensor, a first subset of pixel sensor elements in said sensor where said VLC signal is visible during a first frame. Operation proceeds from step 216 to step 218. In step 218 the device sums pixel values in each row of pixel values corresponding to the first region of the pixel sensor to generate a first array of pixel value sums, at least some of said pixel value sums representing energy recovered from different portions of said VLC light signal, said different portions being output at different times and with different intensities. Operation proceeds from step 218 to step 220. In step 220 the device performs a first demodulation operation on the first array of pixel value sums to recover information communicated by the VLC signal.

In some embodiments, the recovered information includes a first symbol value, different information being recovered from said VLC signal over a period of time. In some embodiments, the first array of pixel value sums represents an array of temporally sequential light signal energy measurements made over a period of time.

In some embodiments, the portion of the VLC signal corresponding to a first symbol from which said first symbol value is produced has a duration equal to or less than the duration of a frame captured by the image sensor.

In some embodiments, step 220 includes steps 222 and 224. In other embodiments, step 220 includes steps 226 and 228.

In some embodiments, the transmitted VLC signal includes pure tones or square waves corresponding to tone frequencies equal to or greater than 150 Hz, and the lowest frequency component of said VLC signal is 150 Hz or larger. In some embodiments, the transmitted VLC signal includes pure tones or square waves corresponding to tone frequencies equal greater than 150 Hz, and the lowest frequency component of said VLC signal is larger than 150 Hz. In some embodiments, the transmitted VLC signal is a digitally modulated signal with binary amplitude (ON or OFF). In some such embodiments, the transmitted VLC signal is a digitally modulated signal with binary ON-OFF signals whose frequency content is at least 150 Hz. Returning to step 222, in step 222 the device determines the frequency of the tone being communicated, each alternative frequency corresponding to a different symbol value. Operation proceeds from step 222 to step 224. In step 224, the device determines a bit sequence which corresponds to the determined tone frequency in accordance with a predetermined mapping.

In some other embodiments, the position, in time of the light intensity pulse is demodulated and mapped to an information bit. In some such embodiments, the codeword is the sequence of recovered bits.

Returning to step 226, in step 226, the device performs one of: an OFDM demodulation, CDMA demodulation, Pulses Position Modulation (PPM) demodulation, or ON-OFF keying demodulation to recover modulated symbols. Operation proceeds from step 226 to step 228, in which the device determines a bit sequence from the recovered modulated symbols in accordance with a predetermined mapping of symbols to bits.

Operation proceeds from step 220, via connecting node B 230, to step 232. In step 232, the device performs additional frame processing and generates symbol values therefrom. Operation proceeds from step 232 to step 234. In step 234, the camera recovers additional information bits from the symbol values generated from the additional frame processing. Operation proceeds from step 234 to step 236.

In step 236 the device identifies a second region of the image sensor corresponding to a second subset of pixel sensor elements in said sensor where said VLC signal is visible during a second time frame, said first and second regions being different. In various embodiments, the device identifies a second region of the image sensor because the device including the camera has moved relative to the VLC transmitter device, e.g., VLC access point transmitting the VLC signal. In some such embodiments, the device identifies a second region of the image sensor in response to a detected motion, e.g., a self-detected motion, of the camera. In some such embodiments, the device identifies a second region of the image sensor in response to a failure to successfully recover information from a previously processed frame. Operation proceeds from step 236 to step 238. In step 238 the device sums pixel values in each row of pixel values corresponding to the second region of the pixel sensor to generate a second array of pixel value sums, at least some of said pixel value sums representing energy recovered from different portions of said VLC light signal, said different portions being output at different times and with different intensities. Operation proceeds from step 238 to step 240. In step 240 the device performs a second demodulation operation on the second array of pixel value sums to recover information communicated by the VLC signal. In some embodiments, step 240 includes steps 242 and 244. In other embodiments, step 240 includes steps 246 and 248.

Returning to step 242, in step 242 the device determines the frequency of the tone being communicated, each alternative frequency corresponding to a different symbol value. Operation proceeds from step 242 to step 244. In step 244, the device determines a bit sequence which corresponds to the determined tone frequency in accordance with a predetermined mapping.

Returning to step 246, in step 246, the device performs one of: an OFDM or CDMA demodulation, Pulse Position Modulation (PPM) demodulation, or ON-OFF keying demodulation to recover modulated symbols. Operation proceeds from step 246 to step 248, in which the device determines a bit sequence from the recovered modulated symbols in accordance with a predetermined mapping of symbols to bits.

Operation proceeds from step 240 to step 250, in which the device performs more additional frame processing and generates symbols therefrom. Operation proceeds from step 250 to step 252. In step 252 the camera recovers additional information bits from the symbol values generated from the more additional frame processing.

In some embodiments, the device receives VLC pilot signals in addition to VLC synchronization signals and VLC data signals. In some such embodiments, a VLC pilot signal is a tone at a predetermined frequency. In some embodiments, the VLC pilot signal is transmitted in a frame following synchronization. In various embodiments, the device measures the frequency of the pilot signal tone, compares it to an expected frequency and performs an adjustment, e.g., a calibration, in response to the amount of deviation detected, e.g., adjusting a sampling rate.

In some embodiments, if the device is unable to detect and successfully decode a VLC signal in the brightest region of an image, the device revises the test criteria for identifying the region of the image to be processed to attempt to recover the VLC signal. For example, the device may identify a second brightest contiguous area in the image to process and try to recover the VLC signal being communicated.

Figure 3:
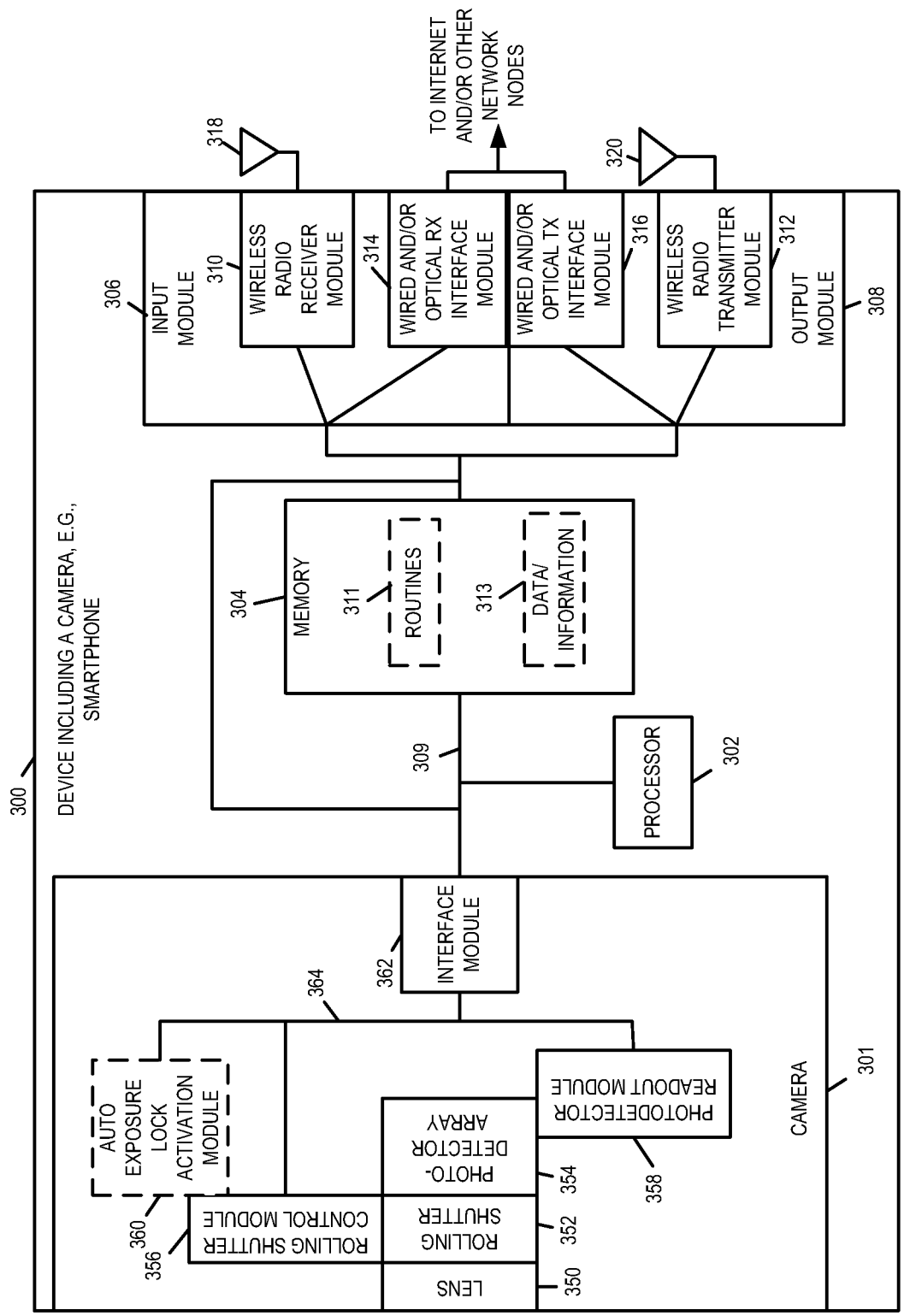
FIG. 3 is a drawing of an exemplary device including a camera in accordance with various exemplary embodiments.

FIG. 3 is a drawing of an exemplary device 300 including a camera 301 in accordance with various exemplary embodiments. Device 300 is, e.g., one of the devices including a camera (device 1 102, . . . , device N 104), e.g., a smartphone, of system 100 of FIG. 1. Exemplary device 300 may, and sometimes does, implement a method in accordance with flowchart 200 of FIG. 2.

Device 300 includes a camera 301, a processor 302, memory 304, an input module 306 and an output module 308 coupled together via a bus 309 over which the various elements (301, 302, 304, 306, 308) may interchange data and information. In some embodiments, memory 304 includes routines 311 and data/information 313. In some embodiments, the input module 306 and output module 308 are located internal to the processor 302.

Camera 301 includes a lens 350, a rolling shutter 352, a photo-detector array 354 which is an image sensor, a rolling shutter control module 356, a photodector readout module 358, an auto exposure lock activation module 360, and a interface module 362. The rolling shutter control module 356, and photodector readout module 358 and interface module 362 are coupled together via bus 364. In some embodiments, camera 301 further includes auto exposure lock activation module 360. Rolling shutter control module 356, photodector readout module 358, and auto exposure lock activation module 360 may, and sometimes do, receive control messages from processor 302 via bus 309, interface module 362 and bus 364. Photodector readout module 358 communicates readout information of photo detector array 354 to processor 302, via bus 364, interface module 362, and bus 309. Thus, the image sensor, photo-detector array 354, is coupled to the processor 302 via photodetctor readout module 358, bus 364, interface module 362, and bus 309.

Rolling shutter control module 356 controls the rolling shutter 350 to expose different rows of the image sensor to input light at different times, e.g., under the direction of processor 302. Photodector readout module 358 outputs information to the processor, e.g., pixel values corresponding to the pixels of the image sensor.

Input module 306 includes a wireless radio receiver module 310 and a wired and/or optical receiver interface module 314. Output module 308 includes a wireless radio transmitter module 312 and a wired and/or optical receiver interface module 316. Wireless radio receiver module 310, e.g., a radio receiver supporting OFDM and/or CDMA, receives input signals via receive antenna 318. Wireless radio transmitter module 312, e.g., a radio transmitter supporting OFDM and/or CDMA, transmits output signals via transmit antenna 320. In some embodiments, the same antenna is used for transmit and receive. Wired and/or optical receiver interface module 314 is coupled to the Internet and/or other network nodes, e.g., via a backhaul, and receives input signals. Wired and/or optical transmitter interface module 316 is coupled to the Internet and/or other network nodes, e.g., via a backhaul, and transmits output signals In various embodiments, processor 302 is configured to: sum pixel values in each row of pixel values corresponding to a first region of an image sensor to generate a first array of pixel value sums, at least some of said pixel value sums representing energy recovered from different portions of said VLC light signal, said different portions being output at different times and with different intensities; and perform a first demodulation operation on the first array of pixel value sums to recover information communicated by the VLC signal.

In some embodiments, processor 302 is further configured to: identify, as said first region of the image sensor, a first subset of pixel sensor elements in said sensor where said VLC signal is visible during a first frame time. In some such embodiments, processor is further configured to identify, a second region of the image sensor corresponding to a second subset of pixel sensor elements in said sensor where said VLC signal is visible during a second frame time, said first and second regions being different. In some such embodiments, processor 302 is further configured to: sum pixel values in each row of pixel values corresponding to the second region of the image sensor to generate a second array of pixel value sums, at least some of said pixel value sums in the second array representing energy recovered from different portions of said VLC light signal, said different portions being output at different times and with different intensities; and perform a second demodulation operation on the second array of pixel value sums to recover information communicated by the VLC signal; and wherein said first demodulation operation produces a first symbol value and said second demodulation produces a second symbol value.

In various embodiments, the recovered information includes a first symbol value, and different information is recovered from said VLC signal over a period of time. In some embodiments, the array of pixel value sums represents an array of temporally sequential light signal energy measurements made over a period of time. In various embodiments, the portion of the VLC signal corresponding to a first symbol from which said first symbol value is produced has a duration equal to or less than the duration of a frame captured by said image sensor.

In some embodiments, processor 302 is configured to identify a frequency from among a plurality of alternative frequencies, as part of being configured to perform a demodulation operation. In some embodiments, the transmitted VLC signal includes pure tones or square waves corresponding to tone frequencies equal to or greater than 150 Hz, and the lowest frequency component of said VLC signal is 150 Hz or larger. In some embodiments, the transmitted VLC signal includes pure tones or square waves corresponding to tone frequencies greater than 150 Hz, and the lowest frequency component of said VLC signal is larger than 150 Hz. In some embodiments, the transmitted VLC signal is a digitally modulated signal with binary amplitude (ON or OFF). In some such embodiments, the transmitted VLC signal is a digitally modulated signal with binary ON-OFF signals whose frequency content is at least 150 Hz.

In some embodiments, processor 302 is configured to perform one of: a OFDM demodulation, CDMA demodulation, Pulse Position Modulation (PPM) demodulation, or ON-OFF keying demodulation to recover modulated symbols, as part of being configured to perform a demodulation operation.

In some embodiments, said image sensor is part of a camera that supports an auto exposure lock which when enabled disables automatic exposure, and processor 302 is further configured to: activate said auto exposure lock; and capturing said pixels values using a fixed exposure time setting.

In some embodiments processor 302 is further configured to detect a beginning of a codeword including a predetermined number of symbols. In some such embodiments, processor 302 is configured to: detect a predetermined VLC sync signal having a duration equal to or less than the duration of a frame; and interpreting said VLC sync signal as an identifier of the beginning of the codeword, as part of being configured to detect a beginning of a codeword.

Figures 4, 4A:
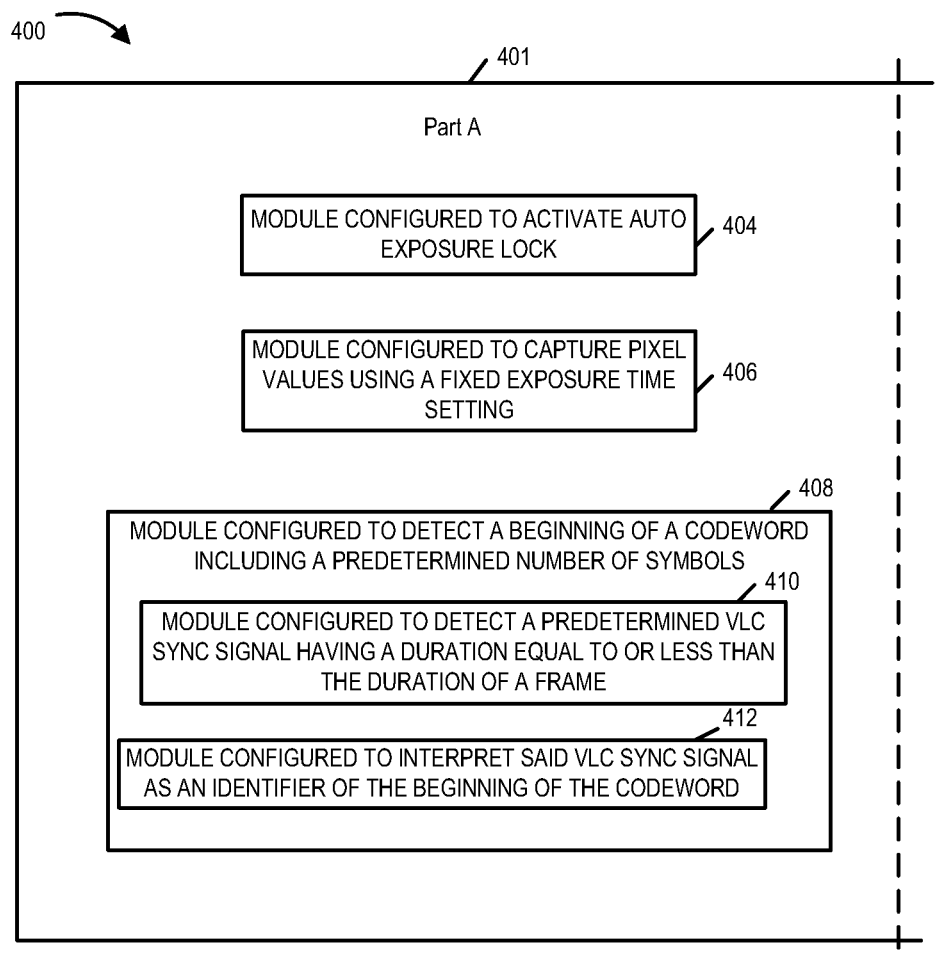
FIG. 4A is a drawing illustrating a first part of an assembly of modules, which can, and in some embodiments is, used in the exemplary device including a camera illustrated in FIG. 3.
Figure 4B:
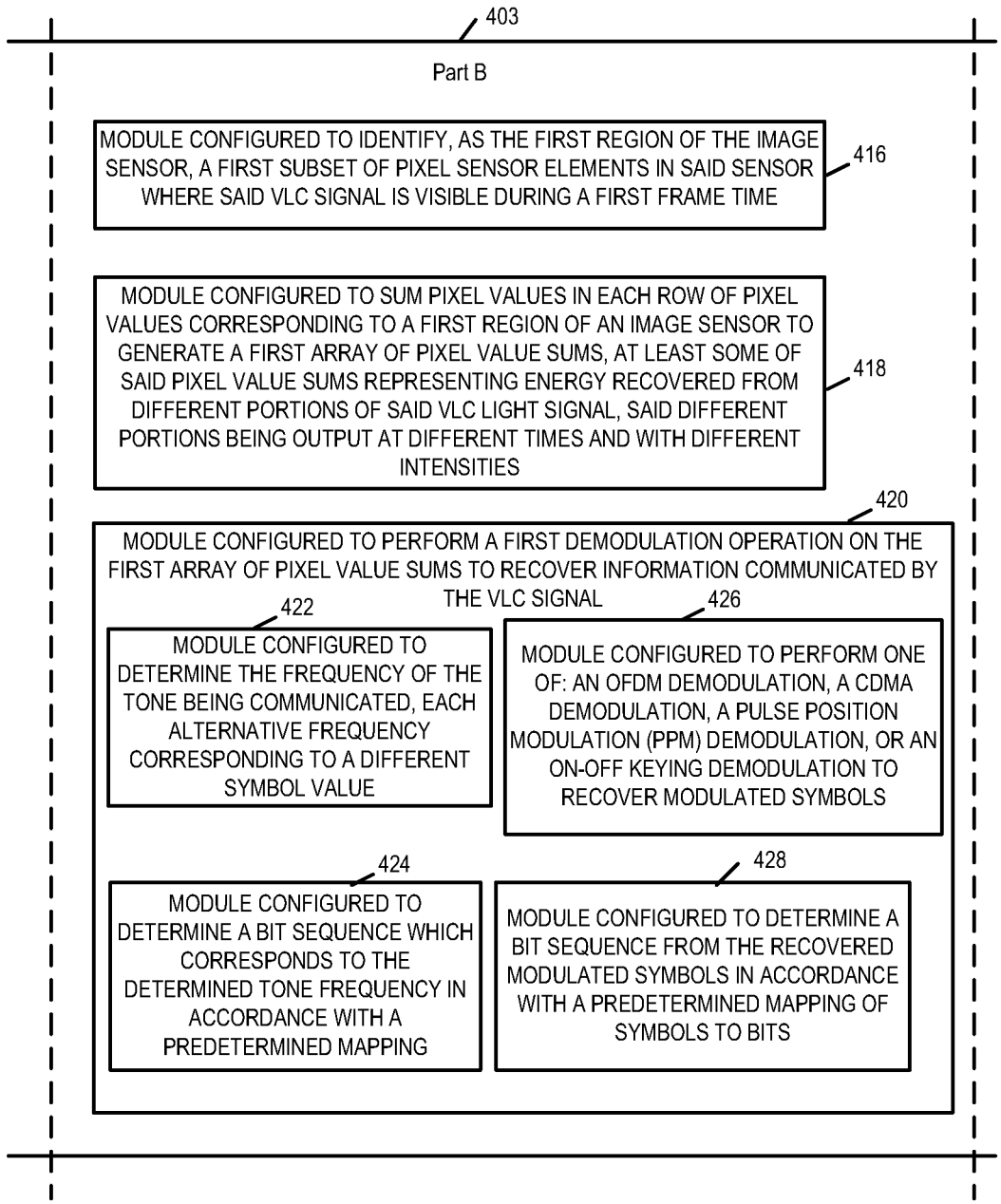
FIG. 4B is a drawing illustrating a second part of an assembly of modules, which can, and in some embodiments is, used in the exemplary device including a camera illustrated in FIG. 3.
Figure 4C:
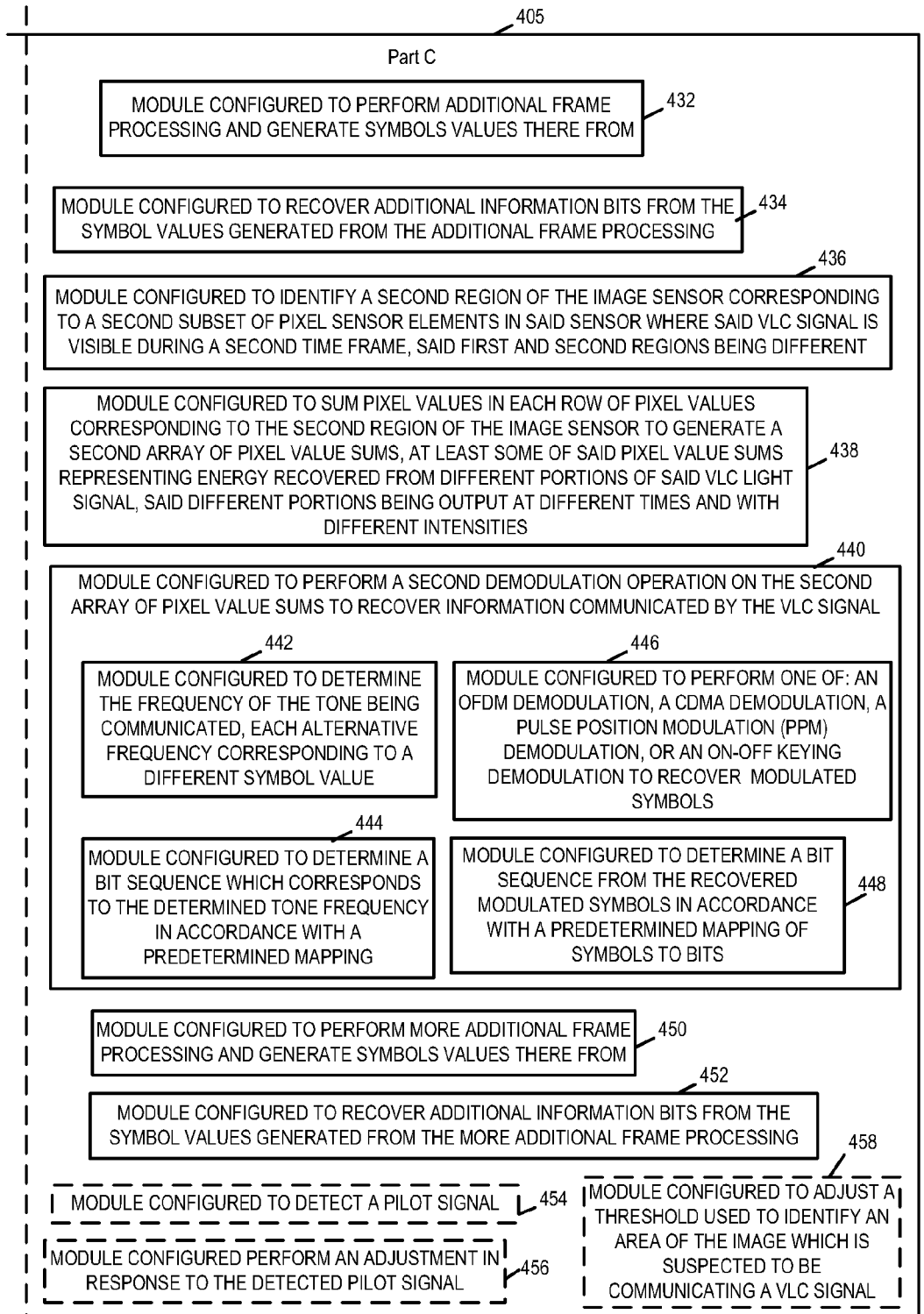
FIG. 4C is a drawing illustrating a third part of an assembly of modules, which can, and in some embodiments is, used in the exemplary device including a camera illustrated in FIG. 3.

FIG. 4, comprising the combination of FIG. 4A, FIG. 4B, and FIG. 4C is a drawing illustrating an assembly of modules 400, comprising the combination of Part A 401, Part B 403, and Part C 405, which can, and in some embodiments is, used in the exemplary device 300 including a camera illustrated in FIG. 3. The modules in the assembly 400 can be implemented in hardware within the processor 302 of FIG. 3, e.g., as individual circuits. Alternatively, the modules may be implemented in software and stored in the memory 304 of device 300 shown in FIG. 3. In some such embodiments, the assembly of modules 400 is included in routines 411 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In some embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the device 300 or elements therein such as the processor 302, to perform the functions of the corresponding steps illustrated and/or described in the method of flowchart 200 of FIG. 2.

Assembly of modules 400 comprises the combination of Part A 401, Part B 403, and Part C 405. Assembly of modules 400 includes a module 404 configured to activate auto exposure lock, a module 406 configured to capture pixel values using a fixed exposure time, and a module 408 configured to detect a beginning of a codeword including a predetermined number of symbols. Module 408 includes a module 410 configured to detect a predetermined VLC sync signal having a duration equal to or less than the duration of a frame, and a module 412 configured to interpret said VLC sync signal as an identifier of a beginning of the codeword.

Assembly of modules 400 further includes a module 416 configured to identify, as a first region of the image sensor, a first subset of pixel sensor elements in said sensor where said VLC signal is visible during a first time frame, and a module 418 configured to sum pixel value sums in each row of pixel values corresponding to a first region of an image sensor to generate a first array of pixel value sums, at least some of said pixel value sums representing energy recovered from different portion of said VLC light signal, said different portion being output at different times and with different intensities. Assembly of modules 400 further includes a module 420 configured to perform a first demodulation operation on the first array of pixel value sums to recover information communicated by the VLC signal. Module 420 includes a module 422 configured to determine the frequency of the tone being communicated, each alternative frequency corresponding to a different symbol value, a module 424 configured to determine a bit sequence which corresponds to the determined tone frequency in accordance with a predetermined mapping. Module 420 further includes a module 426 configured to perform one of: an OFDM demodulation, CDMA demodulation, Pulse Position Modulation (PPM) demodulation, or ON-OFF keying demodulation to recover modulated symbols and a module 428 configured to determined a bit sequence from the recovered modulated symbols in accordance with a predetermined mapping of symbols to bits.

Assembly of modules 400 further includes a module 432 configured to perform additional frame processing and generate symbol values therefrom, a module 434 configured to recover additional information bits from the symbol values generated from the additional frame processing. Assembly of modules 400 further includes a module 436 configured to identify a second region of the image sensor corresponding to a second subset of pixel sensor elements, in said sensor where said VLC signal is visible during a second time frame, said first and second regions being different, a module 438 configured to sum pixel value sums in each row of pixel values corresponding to the second region of the image sensor to generate a second array of pixel value sums, at least some of said pixel value sums representing energy recovered from different portions of said VLC light signal, said different portion being output at different times with different intensities, and a module 440 configured to perform a second demodulation operation on the second array of pixel value sums to recover information communicated by the VLC signal. Module 440 includes a module 442 configured to determine the frequency of the tone being communicated, each alternative frequency corresponding to a different symbol value, a module 444 configured to determine a bit sequence which corresponds to the determined tone frequency in accordance with a predetermined mapping. Module 440 further includes a module 446 configured to perform one of: an OFDM demodulation, CDMA demodulation, Pulse Position Modulation (PPM) demodulation, or ON-OFF keying demodulation to recover modulated symbols and a module 448 configured to determined a bit sequence from the recovered modulated symbols in accordance with a predetermined mapping of symbols to bits.

Assembly of modules 400 further includes a module 450 configured to perform more additional frame processing and generate symbol values therefrom, and a module 452 configured to recover additional information bits from the symbol values generated from the more additional frame processing.

In some embodiments, assembly of modules 400 further includes a module 454 configured to detect a pilot signal and a module 456 configured to perform an adjustment in response to the detected pilot signal. In some embodiments, module 454 estimates the frequency of a detected pilot signal tone. In some embodiments, module 456 compares the frequency estimation obtained from module 454 to an expected frequency of the pilot tone, and adjusts at least one of a clock rate and sampling rate based on the amount of deviation of the estimated frequency from the estimated frequency. In various embodiments, assembly of modules further includes a module 458 configured to adjust a threshold used to identify an area of an image which is suspected to be communicating a VLC signal.

In some embodiments, the first demodulation operation produces a first symbol value and the second demodulation operation produces a second symbol value. In various embodiments, the recovered information includes a first symbol value and different information is recovered from the VLC signal over a period of time.

In some embodiments, the array of pixel values represents an array of temporally sequential light signal energy measurements over a period of time.

In various embodiments, the portion of the VLC signal corresponding to a first symbol which the first symbol value is produces has a duration equal to or less than the duration of a frame captured by the image sensor. In some embodiments, the transmitted VLC signal includes pure tones or square waves corresponding to tone frequencies equal to or greater than 150 Hz, and the lowest frequency component of said VLC signal is 150 Hz or larger. In some embodiments, the transmitted VLC signal includes pure tones or square waves corresponding to tone frequencies greater than 150 Hz, and the lowest frequency component of said signal greater than 150 Hz. In some embodiments, the transmitted VLC signal is a digitally modulated signal with binary amplitude (ON or OFF). In some such embodiments, the transmitted VLC signal is a digitally modulated signal with binary ON-OFF signals whose frequency content is at least 150 Hz.

Figure 5B:
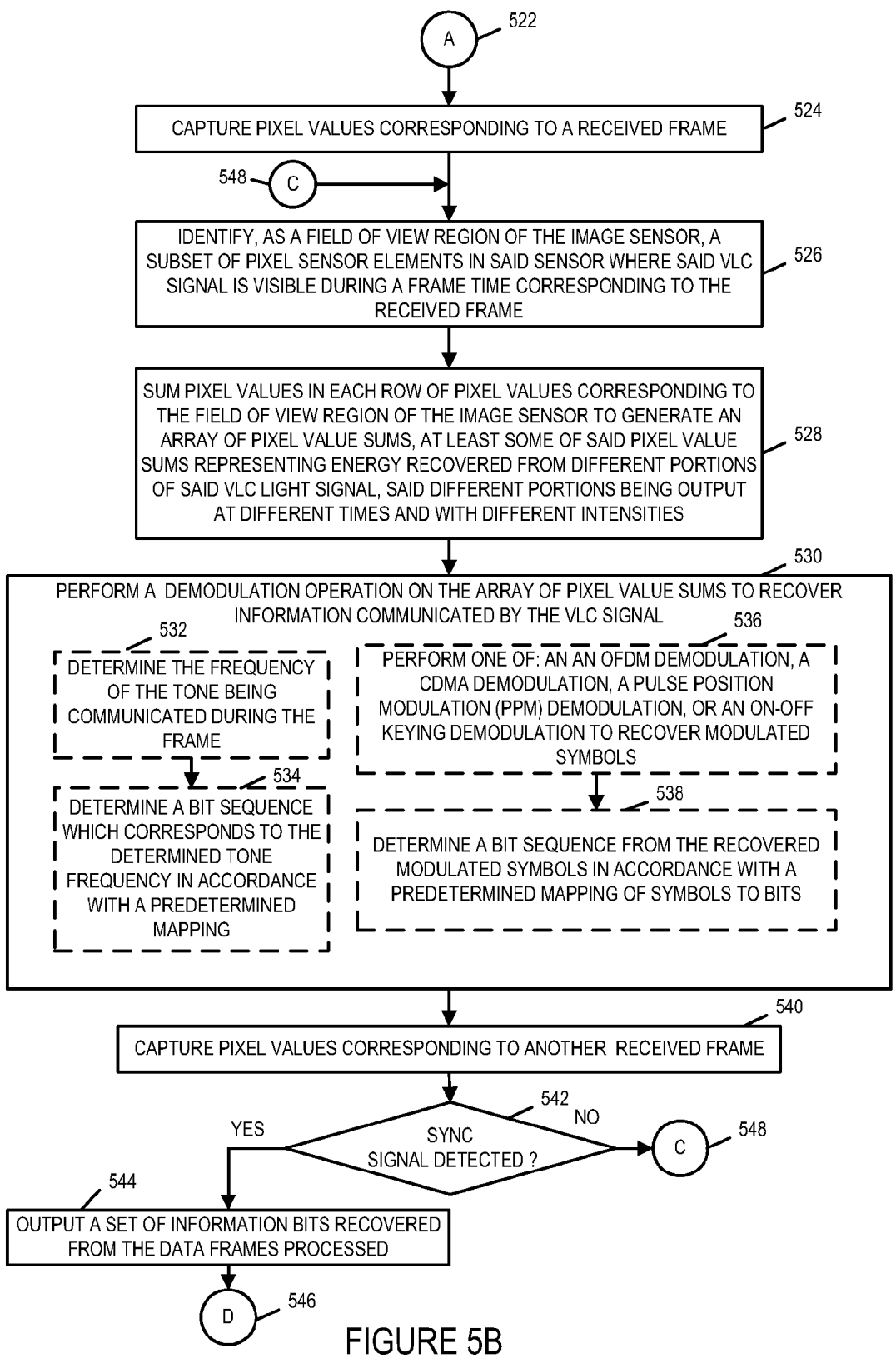
FIG. 5B is a second part of a flowchart of an exemplary method of using a device including a camera to receive and recover information from a visible light communications (VLC) signal in accordance with various exemplary embodiments.

FIG. 5, comprising the combination of FIG. 5A and FIG. 5B, is a flowchart 500 of an exemplary method of using a device including a camera to receive and recover information from a visible light communications (VLC) signal in accordance with various exemplary embodiments. Operation starts in step 502, where the device is powered on and initialized. In some embodiments, the device includes an auto exposure lock feature, and operation proceeds from step 502 to step 504, in which the device activates auto exposure lock. This fixes the frame timing at a predetermined time, e.g., 30 frames per second (fps). Operation proceeds from step 504 to step 506. Returning to step 502, in some embodiments, the device does not include auto exposure lock and operation proceeds from step 502 to step 506.

In step 506, the device captures pixel values, e.g., corresponding to one or more frames. Operation proceeds from step 506 to step 508, in which the device identifies a field of view region of the pixel sensor where the source of the VLC light signal is visible. Operation proceeds from step 508 to step 510.

In step 510 the device detects a synchronization signal in the identified field of view region of the pixel sensor. In some embodiments, the transmitted synchronization signal is a null signal, e.g., the light transmitter is turned-off for a predetermined time interval. In some embodiments, the synchronization signal is a low power signal transmitted at a predetermined power level, e.g., the light transmitter transmits at a lower level and does not vary in time. Operation proceeds from step 510 to step 512, and in some embodiments, to step 514. In step 514, the device estimates a DC-offset, e.g., background light intensity over the identified field of view region of the pixel sensor during the time that the synchronization signal was transmitted.

Returning to step 512, in step 512 the device synchronizes camera frame timing based on the detection of the synchronization signal in the identified field of view of the pixel sensor. In some embodiments, e.g., an embodiment, in which the device does not include an auto exposure lock capability, operation proceeds from step 512 to step 516. In other embodiments, e.g., an embodiment in which the device includes an auto exposure lock feature, operation proceeds from step 512 to step 524.

Returning to step 516, in step 516 the device receives a pilot signal in the identified field of view region of the pixel sensor during a frame immediately following a synchronization signal. In one exemplary embodiments, the transmitted pilot signal is a 150 Hz tone. Operation proceeds from step 516 to step 518, in which the device estimates a sampling rate based on the detected pilot signal. Operation proceeds from step 518 to step 520 in which the device applies the estimated sampling rate.

In one example, the light transmitter transmits a pilot signal at a frequency of 150 Hz. The receiver detects the pilot signal in step 516 and estimates the sampling rate in step 518. For example, consider that the pilot tone is detected at 165 Hz instead of 150 Hz, the device shifts the sampling rate from 30 Hz to 27 Hz (10% change) to compensate, e.g., calibrating the device. Operation proceeds from step 520, via connecting node A 522 to step 524.

In step 524 the device captures pixel values corresponding to a received frame. Operation proceeds from step 524 to step 526. In step 526 the device identifies, as a field of view of the image sensor a subset of pixel sensor elements in said sensor where said VLC signal is visible during a frame time corresponding to the received frame. Operation proceeds from step 526 to step 528. In step 528 the device sums pixel values in each row of pixel values corresponding to the field of view region of the image sensor to generate an array of pixel value sums, at least some of said pixel value sums representing energy recovered from different portions of said VLC light signal, said different portion being output at different times and with different intensities. Operation proceeds from step 528 to step 530.

In step 530 the device performs a demodulation operation on the array of pixel value sums to recover information communicated by the VLC signal. In some embodiments, step 530 includes step 532 and step 534. In other embodiments, step 530 includes step 536 and step 538. In step 532 the device determines the frequency of the tone being communicated during the frame. Operation proceeds from step 532 to step 534. In step 534 the device determines a bit sequence which corresponds to the determined tone frequency in accordance with a predetermined mapping.

Returning to step 536, in step 536, the device performs one of an OFDM demodulation, CDMA demodulation Pulse Position Modulation (PPM) demodulation, or ON-OFF keying demodulation to recover modulated symbols. Operation proceeds from step 536 to step 538, in which the device determines a bit sequence from the recovered modulated symbols in accordance with a predetermined mapping of symbols to bits.

Operation proceeds from step 530 to step 540, in which the device captures pixel values corresponding to another frame. Operation proceeds from step 540 to step 542, in which the device determines if a synchronization (sync) signal was detected in the received frame of step 540. If a sync signal was not detected, operation proceeds from step 542, via connecting node C 548, to step 526 to start processing of the another received frame to recover information, e.g., additional information bits, from the visible light signal.

However, if a sync signal was detected in step 542, then operation proceeds from step 542 to step 544 in which the device outputs a set of information bit recovered from the data frames which have been processed. For example, in one embodiment information bits are recovered from each iteration of step 530 between synchronization signals are concatenated to form a codeword.

Returning to step 544, operation proceeds from step 544, via connecting node D 546 to the input of step 512.

Figures 6, 6A:
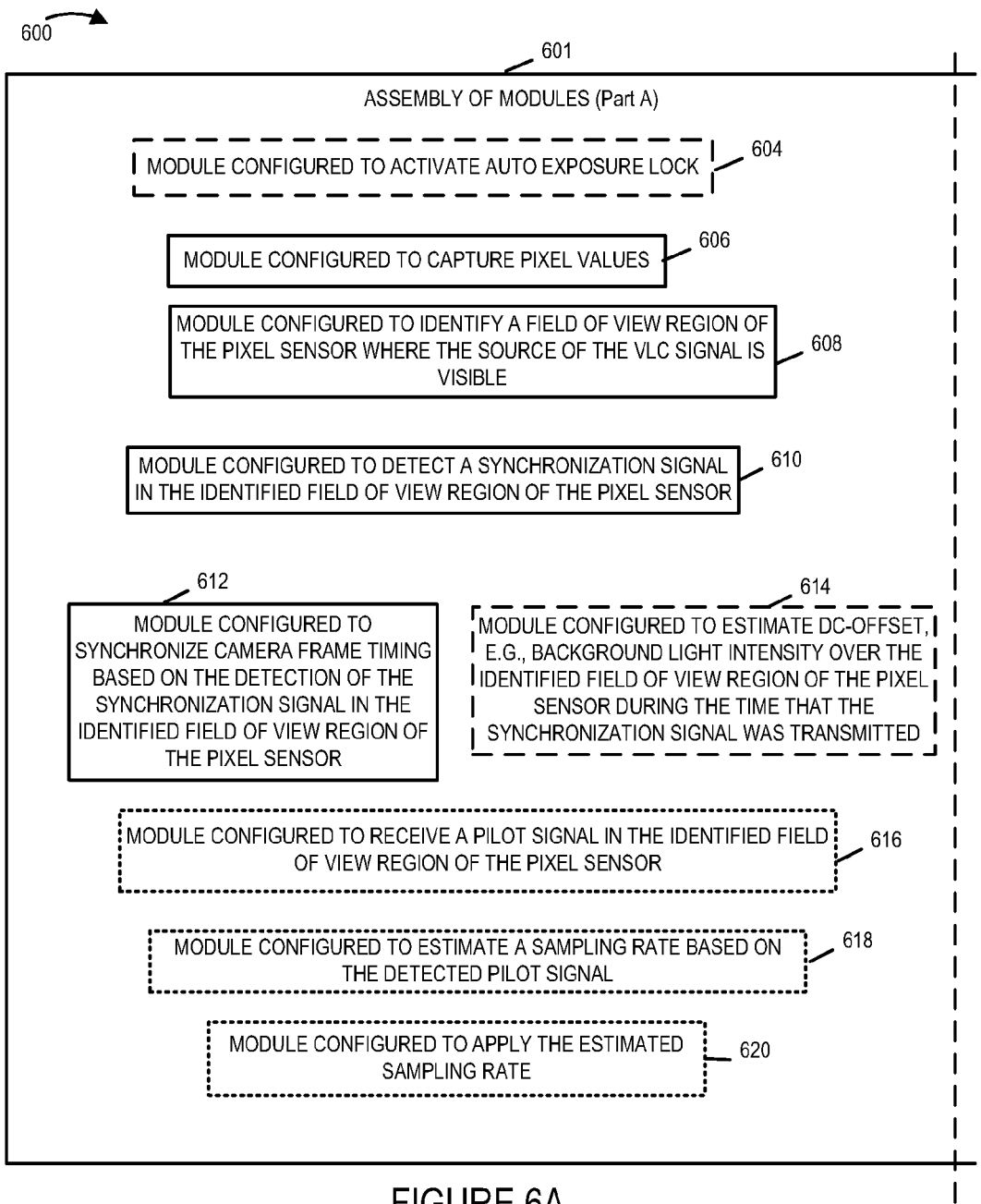
FIG. 6A is a drawing illustrating a first part of an assembly of modules, which can, and in some embodiments is, used in the exemplary device including a camera illustrated in FIG. 3.
Figure 6B:
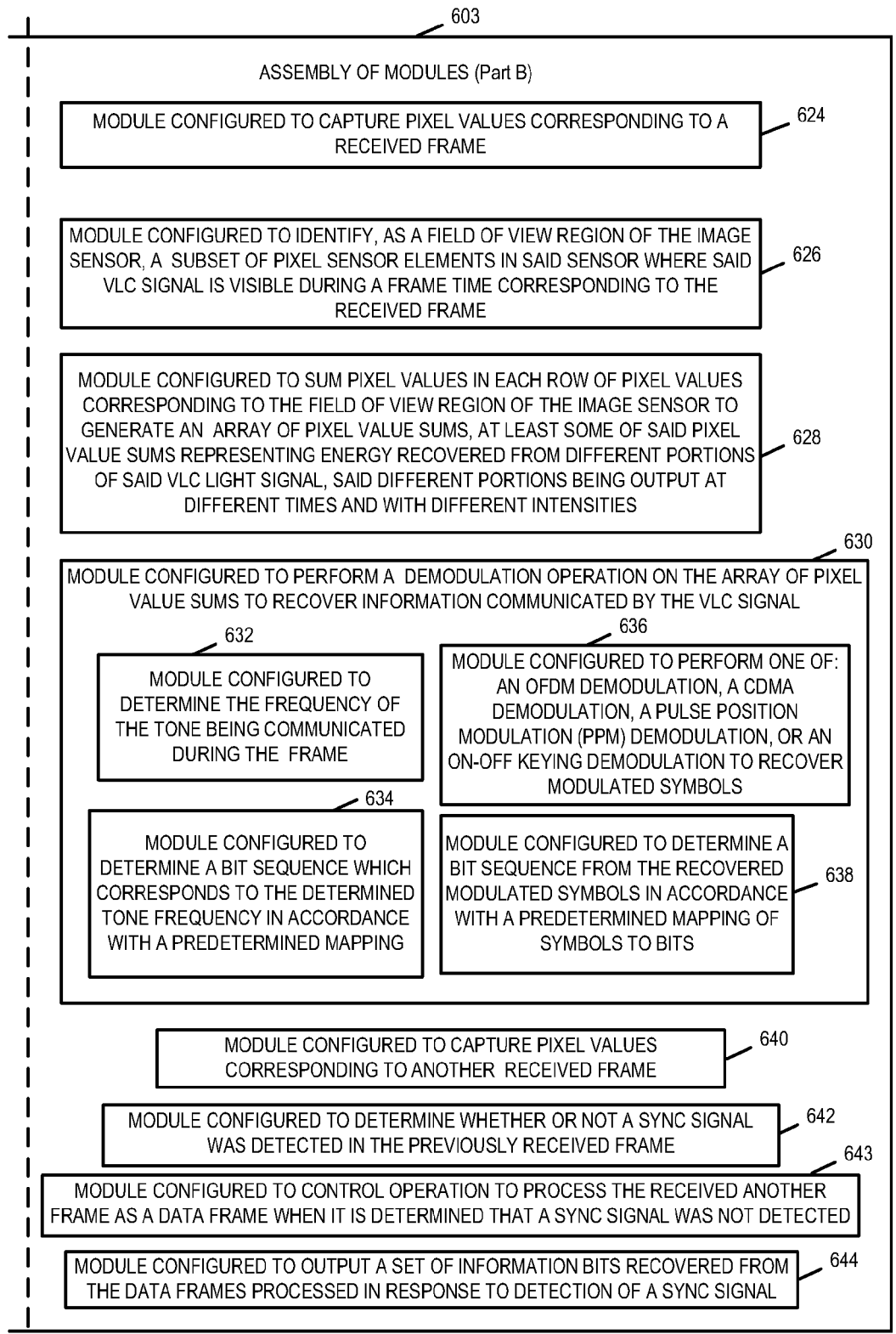
FIG. 6B is a drawing illustrating a second part of an assembly of modules, which can, and in some embodiments is, used in the exemplary device including a camera illustrated in FIG. 3.

FIG. 6, comprising the combination of FIG. 6A and FIG. 6B, is a drawing illustrating an assembly of modules 600, comprising the combination of Part A 601 and Part B 603, which can, and in some embodiments is, used in the exemplary device 300 including a camera illustrated in FIG. 3. The modules in the assembly 400 can be implemented in hardware within the processor 302 of FIG. 3, e.g., as individual circuits. Alternatively, the modules may be implemented in software and stored in the memory 304 of device 300 shown in FIG. 3. In some such embodiments, the assembly of modules 600 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 600. In some embodiments where the assembly of modules 600 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 6 control and/or configure the device 300 or elements therein such as the processor 302, to perform the functions of the corresponding steps illustrated and/or described in the method of flowchart 500 of FIG. 5.

Assembly of modules 600 includes a module 606 configured to capture pixel value, a module 608 configured to identify a field of view region of the pixel sensor where the source of the VLC signal is visible, a module 610 configured to detect a synchronization signal in the identified field of view region of the pixel frame, a module 612 configured to synchronize camera frame timing based on the detection of the synchronization signal in the identified field of view region of the pixel sensor, a module 624 configured to capture pixel values corresponding to a received frame, and a module 626 configured to identify as a field of view region of the image sensor, a subset of pixel sensor elements in said sensor where said VLC signal is visible during a frame time corresponding to the received frame. Assembly of modules 600 further includes a module 628 configured to sum pixel values in each row of pixel values corresponding to the field of view region of the image sensor to generate an array of pixel value sums, at least some of the pixel value sums representing energy recovered from different portions of the said VLC light signal, said different portions being output at different times and with different intensities, and a module 630 configured to perform a demodulation operation on the array of pixel value sums to recover information communicated by the VLC signal. Module 630 includes a module 632 configured to determine the frequency of the tone being communicated during the frame and a module 634 configured to determine a bit sequence which corresponds to the determined tone frequency in accordance with a predetermined mapping, a module 636 configured to perform one of an OFDM demodulation, CDMA demodulation, Pulse Position Modulation (PPM) demodulation, or ON-OFF keying demodulation to recover modulated symbols and a module 638 configured to determine a bit sequence from the recovered modulated symbols in accordance with a predetermined mapping of symbols to bits. Assembly of modules 600 further includes a module 640 configured to capture pixel value sums corresponding to another received frame, a module 642 configured to determine whether or not a synchronization signal was detected in the previously received frame, a module 643 configured to control operation to process the received data frame, when module 642 determined that the sync signal was not received, and a module 644 configured to output a set of information bits recovered from the data frames processed in response to the determination by module 642 that a sync signal was received. In some embodiments, a code word is communicated via a plurality of data frames in between sync signals.

In some embodiments, assembly of modules 600 further includes one or more or all of a module 604 configured to activate auto exposure lock, a module 614 configured to estimate DC-offset, e.g., background light intensity over the identified field of view of view region of the pixel sensor during that time that the synchronization signal was transmitted, a module 616 configured to receive a pilot signal in the identified field of view region of the pixel sensor, e.g., during a frame immediately following a synchronization signal frame, a module 618 configured to estimate a sampling rate based on the detected pilot signal, and a module 620 configured to apply the estimated sampling rate. In various embodiments, module 604 controls the camera to operate at a fixed predetermined frame per second rate, e.g., 30 fps, which matches the VLC transmission data frame rate being used by the VLC access point. In some embodiments, the camera does not include an auto exposure lock feature, and the pilot signal transmission, detection, measurement, and adjustment of sampling rate is used to compensate for the possibility that the exposure setting may be expected to vary. In some embodiments, the pilot signal transmission, detection, measurement, and adjustment of sampling rate is used to compensate for the possibility that an internal clock within the device including the camera does not precisely match the internal clock within the VLC access point transmitter, e.g., based on component tolerance, and/or drift, e.g., due to thermal effects.

Figure 7:
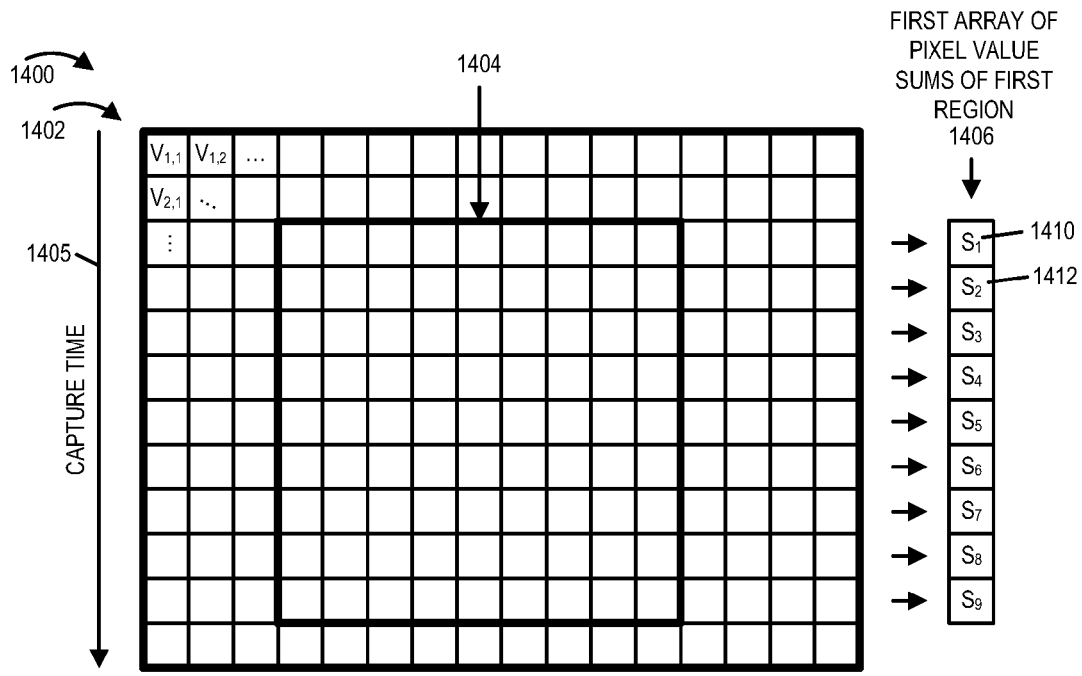
FIG. 7 includes a drawing illustrating an exemplary image sensor, an identified region of the image sensor in which a VLC signal is visible during a first frame time, and a corresponding generated array of pixel sum values, in accordance with an exemplary embodiment.

FIG. 7 includes a drawing 1400 illustrating an exemplary image sensor, an identified region of the image sensor in which the VLC signal is visible during a first frame time, and a corresponding generated array of pixel sum values. Vertical axis 1405 corresponds to capture time; and the rolling shutter implementation in the camera results in different rows of pixels corresponding to different times. Large block 1402 represents an image sensor including an array of 192 pixels which is represented by 12 rows and 16 columns. The small image sensor size (192 pixels) is used for the purpose of explanation. In one exemplary embodiment, the image sensor includes 307200 pixels represented by 480 rows and 640 columns.

Each pixel in the array has a pixel value representing energy recovered corresponding to that pixel during exposure. For example, the pixel of row=1 and column=1 has pixel value $V_{1,1}$.

Block 1404 is an identified first region of the image sensor in which the VLC signal is visible during the first frame. In some embodiments, the first region is identified based on comparing individual pixel values, e.g., an individual pixel luma value, to a threshold and identifying pixels with values which exceed the threshold, e.g., in a contiguous rectangular region in the image sensor. In one exemplary embodiment, the threshold is 50% the average luma value of the image. In some embodiments, the threshold may be, and sometimes is, dynamically adjusted, e.g., in response to a failure to identify a first region or a failure to successfully decode information being communicated by a VLC signal in the first region.

Array 1406 is a first array of pixel value sums of the of first region, in which each element of the array 1406 corresponds to a different row of the first region. For example, array element $S_1$ 1410 represents the sum of pixel values: $V_{3,4}, V_{3,5}, V_{3,6}, V_{3,7}, V_{3,8}, V_{3,9}, V_{3,10}, V_{3,11}$, and $V_{3,12}$; and array element $S_2$ 1412 represents the sum of pixel values: $V_{4,4}, V_{4,5}, V_{4,6}, V_{4,7}, V_{4,8}, V_{4,9}, V_{4,10}, V_{4,11}$, and $V_{4,12}$.

Array element 1410 and array element 1412 correspond to different sample times as the rolling shutter advances. The array 1406 is used to recover a VLC signal being communicated. In some embodiments, the VLC signal being communicated is a signal tone, e.g., one particular frequency in a set of predetermined alternative frequencies, during the first frame, and the single tone corresponds to a particular bit pattern in accordance with known predetermined tone to bit pattern mapping information.

Figure 8:
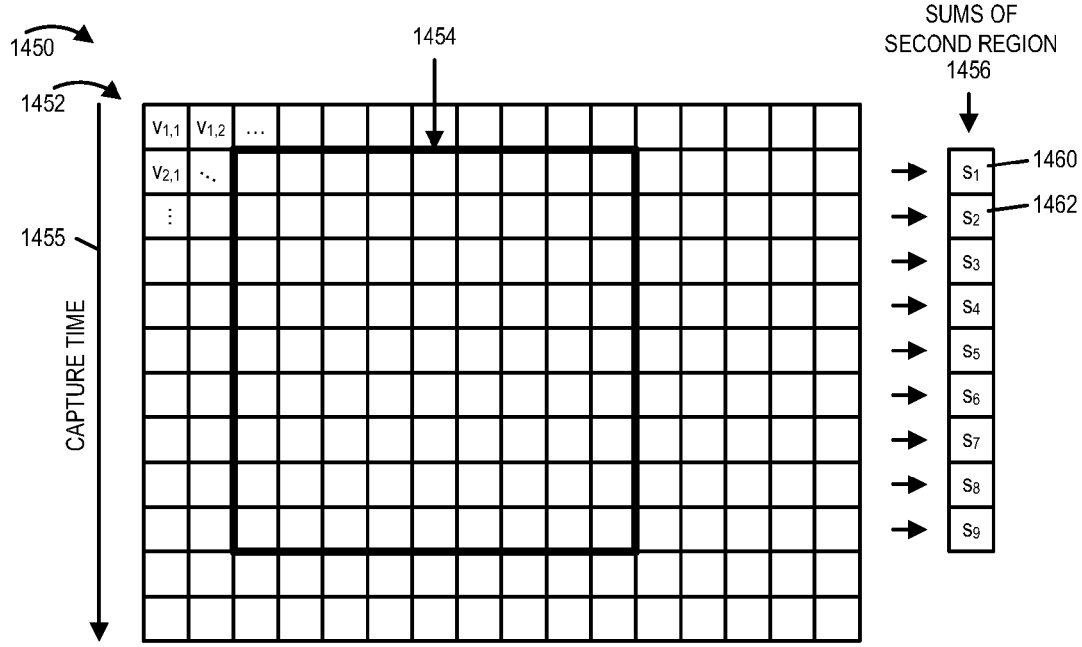
FIG. 8 illustrates a drawing illustrating an exemplary image sensor, an identified region of the image sensor in which the VLC signal is visible during a second frame time, and a corresponding generated array of pixel sum values in accordance with an exemplary embodiment.

FIG. 8 illustrates a drawing 1450 illustrating an exemplary image sensor, an identified region of the image sensor in which the VLC signal is visible during a second frame time, and a corresponding generated array of pixel sum values. Consider that the camera has moved with respect to the light source transmitting the VLC signal from the time corresponding to the frame recovered for the example of FIG. 7.

Vertical axis 1455 corresponds to capture time; and the rolling shutter implementation in the camera results in different rows of pixels corresponding to different times. Large block 1452 represents an image sensor including an array of 192 pixels which is can be represented by 12 rows and 16 columns.

Each pixel in the array has a pixel value representing energy recovered corresponding do that pixel during exposure. For example, the pixel of row=1 and column=1 has pixel value $v_{1,1}$.

Block 1454 is an identified second region of the image sensor in which the VLC signal is visible during the second frame. In some embodiments, the second region is identified based on comparing individual pixel values to a threshold and identifying pixels with values which exceed the threshold, e.g., in a contiguous rectangular region in the image sensor.

Array 1456 is a second array of pixel value sums of the of second region, in which each element of the array 1456 corresponds to a different row of the first region. For example, array element $s_1$ 1460 represents the sum of pixel values: $v_{2,3}$, $v_{2,4}$, $v_{2,5}$, $v_{2,6}$, $v_{2,7}$, $v_{2,8}$, $v_{2,9}$, $v_{2,10}$, and $v_{2,11}$; and array element $s_2$ 1462 represents the sum of pixel values: $v_{3,3}$, $v_{3,4}$, $v_{3,5}$, $v_{3,6}$, $v_{3,7}$, $v_{3,8}$, $v_{3,9}$, $v_{3,10}$, and $v_{3,11}$.

Array element 1460 and array element 1462 correspond to different sample times as the rolling shutter advances. The array 1456 is used to recover a VLC signal being communicated. In some embodiments, the VLC signal being communicated is a signal tone, e.g., one particular frequency in a set of predetermined alternative frequencies, during the first frame, and the single tone corresponds to a particular bit pattern in accordance with known predetermined tone to bit pattern mapping information.

In various embodiments, the size of first region 1404 may be, and sometimes is, different than the size of second region 1454.

Figure 9:
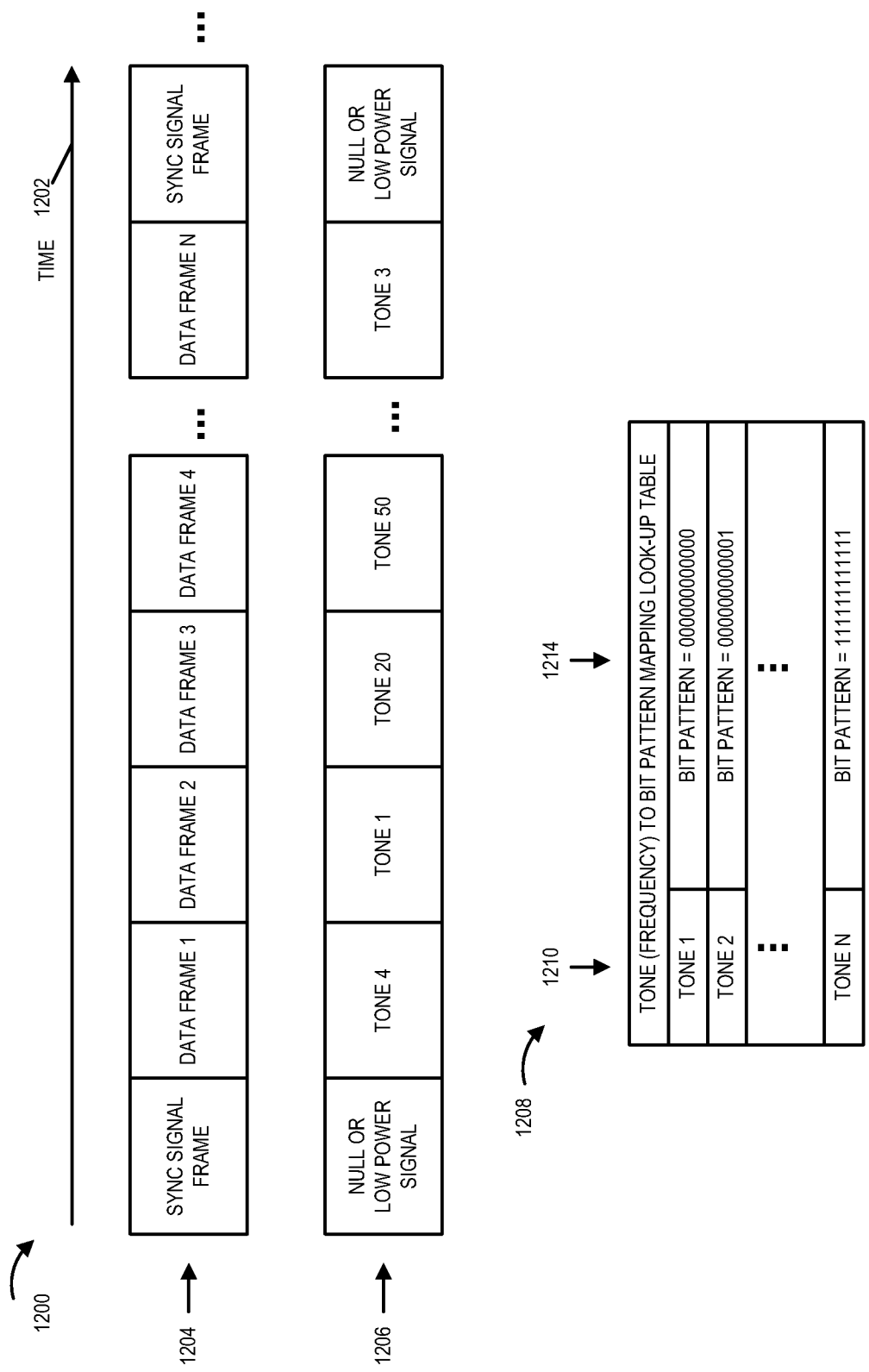
FIG. 9 includes drawing which illustrates a VLC signaling frame structure, exemplary signaling corresponding to each frame, and a tone to bit pattern look-up table in accordance with an exemplary embodiment.

FIG. 9 includes drawing 1200 which illustrates a VLC signaling frame structure 1204, exemplary signaling corresponding to each frame 1206, and a tone to bit pattern look-up table 1208 in accordance with an exemplary embodiment. Horizontal axis 1202 represents time. In this exemplary embodiment, consider that the device including the camera includes a rolling shutter, supports auto exposure lock, and is operating in an auto exposure lock enabled mode which disables automatic exposure and captures pixels using a fixed predetermined time setting, e.g., 30 frames per second.

The exemplary recurring VLC signaling frame structure 1204 includes a synchronization signal frame, followed by a plurality of data frames (data frame 1, data frame 2, data frame 3, data frame 4, . . . , data frame N). Exemplary VLC signaling 1206 includes: a null or low power signal during the synchronization frame, a tone 4 signal during data frame 1, a tone 1 signal during data frame 2, a tone 20 signal during data frame 3, a tone 50 signal during data frame 4, . . . , and a tone 3 signal during data frame N.

Each different tone corresponds to a different bit pattern in accordance with the tone (frequency) to bit pattern mapping look-up table 1208. Column 1210 represents tone and column 1214 identifies the corresponding bit pattern for each tone. For example, tone 1 corresponds to bit pattern=000000000000; tone 2 corresponds to bit pattern=000000000001; and tone N corresponds to bit pattern=111111111111. Each of the tones in table 1208 are at different frequencies above 150 Hz.

In various embodiments, frame structure information 1204 and the tone (frequency) to bit pattern mapping information look-up table 1208 is stored in memory of the device including the camera, e.g., memory 304 of device 300 of FIG. 3.

Figure 10:
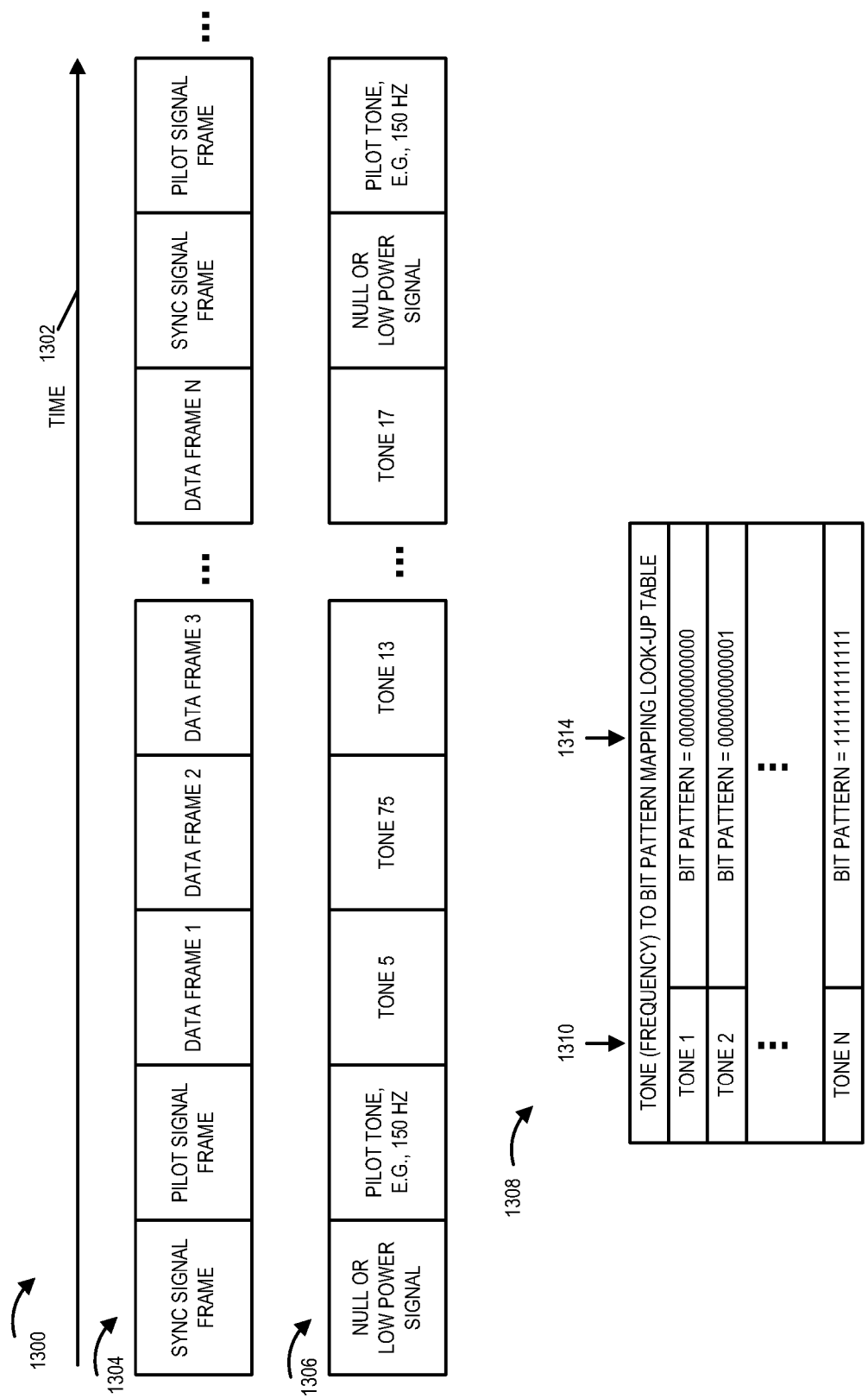
FIG. 10 includes drawing which illustrates an exemplary VLC signaling frame structure, exemplary signaling corresponding to each frame, and a tone to bit pattern look-up table in accordance with an exemplary embodiment.

FIG. 10 includes drawing 1300 which illustrates an exemplary VLC signaling frame structure 1304, exemplary signaling corresponding to each frame 1306, and a tone to bit pattern look-up table 1308 in accordance with an exemplary embodiment. Horizontal axis 1302 represents time. In this exemplary embodiment, consider that the device including the camera includes a rolling shutter; however, the camera may not operate at a fixed frame rate. The sampling rate may drift in the case that auto-exposure is enabled. In this example, a pilot signal of known frequency is occasionally transmitted, e.g., during the frame following the synchronization. The device including the camera detects the pilot signal and estimates the sampling rate, and the device including the camera shifts, e.g., adjusts the sampling rate to compensate.

The exemplary recurring VLC signaling frame structure 1304 includes a synchronization signal frame, followed by a pilot signal frame, followed by a plurality of data frames (data frame 1, data frame 2, data frame 3, . . . , data frame N). Exemplary VLC signaling 1306 includes: a null or low power signal during the synchronization frame, a pilot tone signal, e.g., a 150 Hz tone signal, during the pilot signal frame, a tone 5 signal during data frame 1, a tone 75 signal during data frame 2, a tone 13 signal during data frame 3, . . . , and a tone 17 signal during data frame N.

Each different tone corresponds to a different bit pattern in accordance with the tone (frequency) to bit pattern mapping look-up table 1308. Column 1310 represents tone and column 1314 identifies the corresponding bit pattern for each tone. For example, tone 1 corresponds to bit pattern=000000000000; tone 2 corresponds to bit pattern=000000000001; and tone N corresponds to bit pattern=111111111111. Each of the tones in table 1308 are at different frequencies above 150 Hz.

In various embodiments, frame structure information 1304 and the tone (frequency) to bit pattern mapping information look-up table 1308 is stored in memory of the device including the camera, e.g., memory 304 of device 300 of FIG. 3.

In some embodiments, data frames of the VLC signal convey more information than frequency, e.g., a VLC signal corresponding to a data frame conveys frequency and phase information, e.g., communicating one or more OFDM QAM modulation symbols. In some such embodiments, a look-up table mapping QAM modulation symbol values to bit pattern mapping is stored in the memory of the device including the camera, e.g., memory 304 of device 300 of FIG. 3.

In some embodiments, the synchronization frame is intentionally longer than the data frame. In one embodiment, the synchronization frame has a duration of 1.5 the duration of a data frame. In another embodiment, the synchronization frame has a duration of 2 data frames.

Various aspects and/or features of some, but not necessarily all, embodiments, are further discussed below. Typical smartphone cameras have a rolling shutter implementation, which means that consecutive rows of the photodetector array, e.g., CMOS photodetector array, are read-out at different times. For example, for 720p video recording, there are 480 rows and 640 columns in the array. The read-out of the array occurs row by row so that the first row is read out first, after which the second row is read out and so on. If the frame rate is 30 Hz, this means that the rate of row read-out is 30*480=14.4 KHz, hence the receiver bandwidth is 7.2 KHz. In higher-end cameras, the available receiver bandwidth may be higher due to the fact that either the resolution or the frame rate, or both, may be higher. For example, in a 1080p recording at 60 Hz frame rate, the receiver bandwidth may be 1080*60/2=30.24 KHz. In general, the receiver bandwidth may denoted as W. The operation of an exemplary receiver and exemplary transmitter are further discussed below. Aside from dictating the bandwidth available for signaling, the receiver also imposes other constraints which are discussed next.

The receiver processing element such as, e.g., the Video Front End or the Applications Processor, obtains a sequence of frames from the camera sensor. Each frame is as an N×M matrix of pixel values, where the n-th row and m-th column pixel value is denoted by P_nm.

The first step for the receiver is to identify the subset of the pixel array where the source of the VLC signal is visible. This region may be referred to as the Field of View (FOV) of the receiver. The FOV is characterized by a much larger SNR than the rest of the image. In one embodiment, the receiver identifies this region by performing identifying pixels that are brighter than the others. For example, the receiver sets a threshold T, such that if the pixel intensity in luma values is greater than T, the pixel is considered to be part of the FOV. The threshold T is, for instance, 50% of the average luma value of the image.

Figure 11:
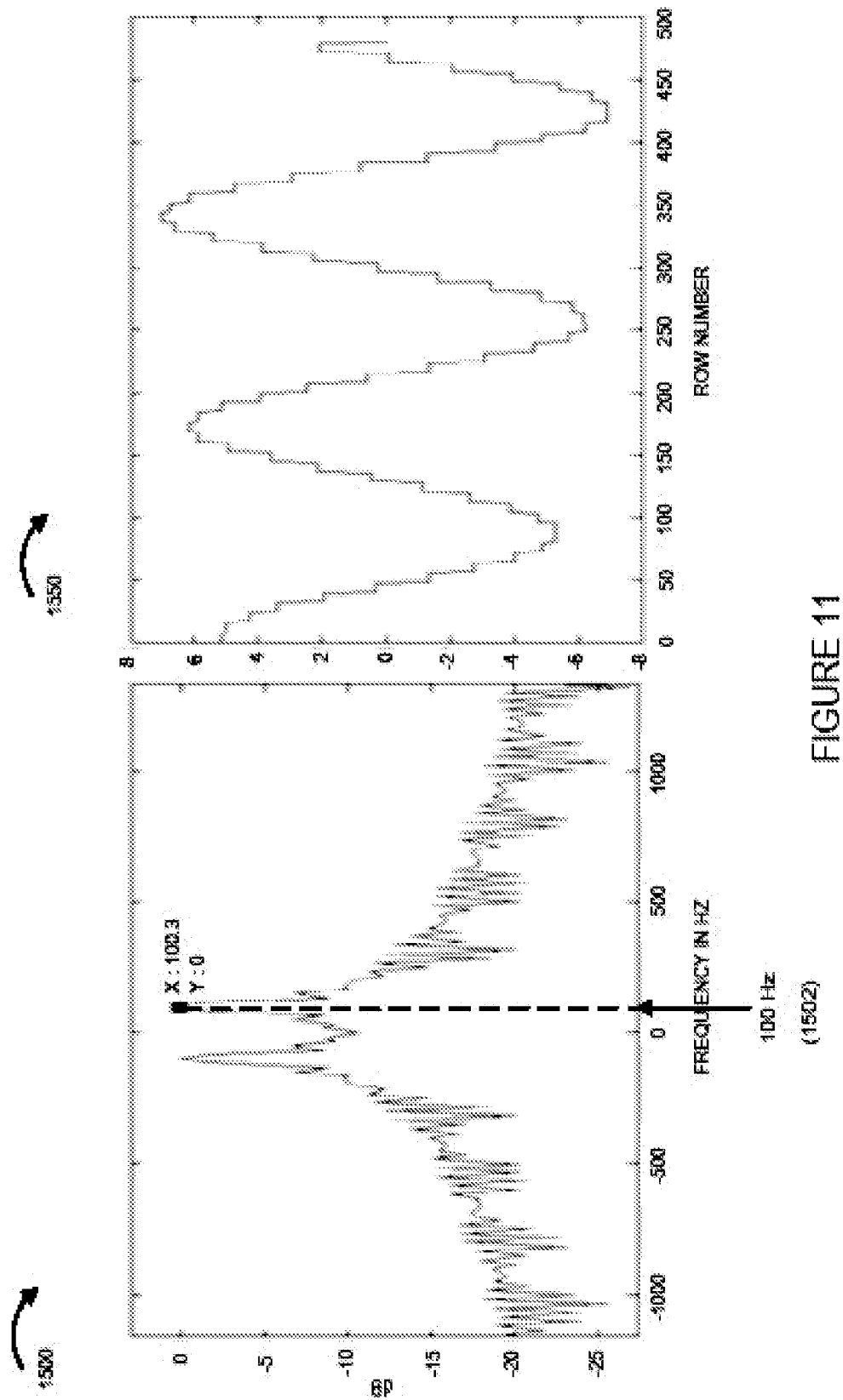
FIG. 11 includes an exemplary plot illustrating recovered sums of rows of pixel values in a field of view of a frame and a plot indicating the identified tone (frequency) being communicated in the frame by the VLC signal.

Once the FOV has been identified, the receiver adds the energy in the pixels that fall in the FOV, one row at a time. For instance, if the FOV is the sub-matrix F containing the top 100 rows and 100 columns of the overall frame, the receiver will add the pixel luma values of each of the 100 rows to come up with a 1×100 array of values representing the energy in the rows of the FOV. The signal array is denoted by S. An example of this signal is plotted in drawing 1550 of FIG. 11, where the transmitted signal was 100 Hz and the FOV occupied the entire 480 rows. As can be seen from the FFT plot 1500 of FIG. 11, sinusoidal signal detected is at 100 Hz identified by arrow 1502. In some embodiments, the transmitted signal is intentionally 150 Hz or higher, so as not to annoy a human observer in the vicinity.

The receiver performs the demodulation of the signal S. The demodulation method depends on the modulation format, which is either a priori known to the receiver (through a prior agreement over an out-of-band channel) or transmitted by the transmitter in a pre-amble signal. The demodulation may be, and in some embodiments is, as simple as detecting the frequency of the tone and mapping it into the corresponding bit-sequence depending on the codeword. The modulation can be, and in some embodiments is, more complex in that the information may be transmitted in the phase of a tone (using a QAM constellation) and multiple tones may be used in an OFDM scheme.

Within the available bandwidth W, the transmitter may use any modulation scheme such as OFDM/CDM/TDM on top of coherently modulated constellations such as QAM. In various embodiments, a simple OFDM signaling technique in the frequency of the pure tone conveys the information. This simple transmission technique has benefits in terms of Peak-to-Average-Power-Ration (PAPR) reduction and simplifies the receiver design. Various important parameters and components of an exemplary transmitted signal are further discussed below.

In some embodiments, the signal itself is a pure tone. In some such embodiments, the tone frequency conveys the information bits. In various embodiments, the tone frequency is intentionally larger than 150 Hz. This is because the human eye can detect light flicker at frequencies below this "fusion threshold". The highest frequency is determined by the available bandwidth of the receiver, W. Alternatively, the transmitter, in some embodiments, transmits at frequencies that are much higher than W and relies on aliasing at the receiver. For example, the lowest frequency may be 2W+150 Hz and the highest frequency may be 3 W.

The frequency increment between different tones is determined by the stability of the transmitter and receiver sampling clocks and is usually close to 1 Hz. This means that, in the case that W=7.2 KHz and a resolution of 1 Hz, each tone can convey 12 bits of information. Since the location of the FOV in the overall image is unknown to the receiver, the tone duration, in one exemplary embodiment, is equal to the duration of the frame. For example, for a frame rate of 30 Hz, each tone will be transmitted for 33 ms. In this way, no matter what portion of the overall image is contained in the matrix F, the tone carrying the information bits will be detectable. The total amount of information that can be carried in this way, for this particular example, is then 360 bits per second which should be sufficient to convey a MAC address (48 bits) or SSID in a reasonable amount of time.

The receiver needs to know the start and end of the sequence of symbols (for the pure tones embodiment) in order to decode the overall message. In some embodiments where the symbols are pure tones and occupy the duration of one frame, synchronization is performed by the transmitter shutting off transmission for the duration of one frame. The receiver knows that the start of the codeword (sequence of symbols) begins after the silent period. The added benefit of shutting off the transmitter for the duration of one frame is that the receiver can use that time to estimate the DC-offset (background light intensity) over the region occupied by the FOV.

In some embodiments, the camera of the receiver may not operate at a fixed frame rate. The sampling rate may drift in the case that auto-exposure is enabled. Clearly an accurate estimation of the frame rate is crucial in correctly detecting the tone symbols. Because of this, in some embodiments, the transmitter may need to transmit a pilot signal of known frequency occasionally. In one exemplary embodiment, the transmitter transmits a pilot signal at a frequency of 150 Hz during the frame immediately following the silent period that is used for synchronization. The receiver detects the pilot signal and estimates the sampling rate. For example, if the pilot tone is detected at 165 Hz instead of 150 Hz, the receiver shifts the sampling rate from 30 Hz to 27 Hz (10% change). Another way around this problem is if the receiver hardware accurately reports the frame rate in which case the transmitter need not use a pilot. In some embodiments, the receiver reports the frame rate. Yet another way is by disabling auto-exposure. Most commercial phones do not have ability to disable this feature through software, however, and would require low-level access to camera drivers. In some embodiments, the camera driver of a commercial phone is modified to include the capability to disable auto-exposure.

In various embodiments a device, e.g., device including a camera, e.g., device 102 or device 104 in system 100 of FIG. 1, and/or device 300 of FIG. 3, and/or a device including a camera of any of the FIGS. 1-11 includes a module corresponding to each of the individual steps and/or operations described with regard to any of the FIGS. 1-11 in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the device, e.g., device including a camera, cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., devices including camera such as smartphones including cameras, VLC access points, e.g., an LED VLC access point, base stations supporting wireless radio communications, network nodes, other mobile nodes such as mobile terminals supporting cellular and/or peer to peer communications, access points such as base stations including, e.g., femto base stations and macro base stations, cellular base stations, non-cellular base stations, PLC gateway devices, and/or communications systems. Various embodiments are also directed to methods, e.g., method of controlling and/or operating devices including cameras such as smartphones including cameras, network nodes, VLC access points, PLC gateway devices, mobile nodes, access points such as base stations including macro base stations and femto base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a device including a camera such as a smartphone including a camera, including a processor configured to implement one, multiple or all of the steps of one or more methods of the invention.

In some embodiments, the processor or processors, e.g., CPUs, of one or more devices, e.g., smartphones including cameras, VLC access points, gateway devices, network nodes, access nodes such as base stations including macro base stations and femto base stations and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., a communications node such as device including a camera, e.g., a smartphone including a camera, with a processor which includes a module corresponding to each of the steps of the various described methods performed by the device in which the processor is included. In some but not all embodiments a device, e.g., a communications node such as a device including a camera, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited for communications systems supporting both wireless radio communications and VLC signaling. While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points such as VLC access points, wireless radio cellular macro base stations, wireless radio femto base stations, and/or wireless radio non-cellular base stations, which establish communications links with mobile nodes using VLC signaling, OFDM and/or CDMA and/or may provide connectivity to the internet or another network via a wired or wireless communications link. In various embodiments the mobile nodes are implemented as smartphones including camera, notebook computers including cameras, personal data assistants (PDAs) including cameras, or other portable devices including a camera and including receiver/transmitter circuits and logic and/or routines, for implementing the methods.

What is claimed is:

1. A method of using a device including a camera to receive and recover information from a visible light communication (VLC) signal, the method comprising:
    summing pixel values in each row of pixel values corresponding to a first region of an image sensor to generate a first array of pixel value sums, at least some of said pixel value sums representing energy recovered from different portions of said VLC light signal, said different portions being output at different times and with different intensities; and
    performing a first demodulation operation on the first array of pixel value sums to recover information communicated by the VLC signal.

2. The method of claim 1, wherein said recovered information includes a first symbol value, different information being recovered from said VLC signal over a period of time.

3. The method of claim 1, wherein said array of pixel value sums represents an array of temporally sequential light signal energy measurements made over a period of time.

4. The method of claim 2, wherein the portion of the VLC signal corresponding to a first symbol from which said first symbol value is produced has a duration equal to or less than the duration of a frame captured by said image sensor.

5. The method of claim 1, wherein said image sensor is part of a camera that supports an auto exposure lock which when enabled disables automatic exposure, the method further comprising:
    activating said auto exposure lock; and
    capturing said pixels values using a fixed exposure time setting.

6. The method of claim 1, wherein the transmitted VLC signal includes pure tones or square waves corresponding to tone frequencies equal to or greater than 150 Hz, and the lowest frequency component of said VLC signal is 150 Hz or larger.

7. The method of claim 1, further comprising detecting a beginning of a codeword including a predetermined number of symbols, said detecting including:
    detecting a predetermined VLC sync signal having a duration equal to or less than the duration of a frame; and
    interpreting said VLC sync signal as an identifier of the beginning of the codeword.

8. A device including a camera which receives and recovers information from a visible light communication (VLC) signal, the device comprising:
    means for summing pixel values in each row of pixel values corresponding to a first region of an image sensor to generate a first array of pixel value sums, at least some of said pixel value sums representing energy recovered from different portions of said VLC light signal, said different portions being output at different times and with different intensities; and
    means for performing a first demodulation operation on the first array of pixel value sums to recover information communicated by the VLC signal.

9. The device of claim 8, wherein said recovered information includes a first symbol value, different information being recovered from said VLC signal over a period of time.

10. The device of claim 9, wherein the portion of the VLC signal corresponding to a first symbol from which said first symbol value is produced has a duration equal to or less than the duration of a frame captured by said image sensor.

11. The device of claim 8, wherein said array of pixel value sums represents an array of temporally sequential light signal energy measurements made over a period of time.

12. The device of claim 8, wherein said image sensor is part of a camera that supports an auto exposure lock which when enabled disables automatic exposure, the device further comprising:
    means for activating said auto exposure lock; and
    means for capturing said pixels values using a fixed exposure time setting.

13. The device of claim 8, wherein the transmitted VLC signal includes pure tones or square waves corresponding to tone frequencies equal to or greater than 150 Hz, and the lowest frequency component of said VLC signal is 150 Hz or larger.

14. The device of claim 8, further comprising means for detecting a beginning of a codeword including a predetermined number of symbols, said means for detecting including:
    means for detecting a predetermined VLC sync signal having a duration equal to or less than the duration of a frame; and
    means for interpreting said VLC sync signal as an identifier of the beginning of the codeword.

15. A computer program product for use in a device including a camera which receives and recovers information from visible light communication (VLC) signal, the computer program product comprising:
    a non-transitory computer readable medium comprising:
        code for causing at least one computer to sum pixel values in each row of pixel values corresponding to a first region of an image sensor to generate a first array of pixel value sums, at least some of said pixel value sums representing energy recovered from different portions of said VLC light signal, said different portions being output at different times and with different intensities; and
        code for causing said at least one computer to perform a first demodulation operation on the first array of pixel value sums to recover information communicated by the VLC signal.

16. A device including a camera which receives and recovers information from a visible light communication (VLC) signal comprising:
    an image sensor;
    at least one processor coupled to said image sensor, said processor being configured to:
        sum pixel values in each row of pixel values corresponding to a first region of said image sensor to generate a first array of pixel value sums, at least some of said pixel value sums representing energy recovered from different portions of said VLC light signal, said different portions being output at different times and with different intensities; and
        perform a first demodulation operation on the first array of pixel value sums to recover information communicated by the VLC signal; and
    memory coupled to said at least one processor.

17. The device of claim 16, wherein said recovered information includes a first symbol value, different information being recovered from said VLC signal over a period of time.

18. The device of claim 17, wherein the portion of the VLC signal corresponding to a first symbol from which said first symbol value is produced has a duration equal to or less than the duration of a frame captured by said image sensor.

19. The device of claim 16, wherein said array of pixel value sums represents an array of temporally sequential light signal energy measurements made over a period of time.

20. The device of claim 16, wherein said image sensor is part of the camera, and wherein the camera supports an auto exposure lock which when enabled disables automatic exposure, and wherein said at least one processor is further configured to:
   activating said auto exposure lock; and
   capturing said pixels values using a fixed exposure time setting.

* * * * *